(12) United States Patent
Fukushima et al.

(10) Patent No.: US 12,136,268 B2
(45) Date of Patent: Nov. 5, 2024

(54) SEARCH SUPPORT SYSTEM AND SEARCH SUPPORT METHOD

(71) Applicant: PANASONIC I-PRO SENSING SOLUTIONS CO., LTD., Fukuoka (JP)

(72) Inventors: Yoshitaka Fukushima, Fukuoka (JP); Takeshi Shimada, Fukuoka (JP); Hiroaki Ootake, Fukuoka (JP); Takuya Kise, Fukuoka (JP); Masakazu Fujii, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 329 days.

(21) Appl. No.: 17/578,096

(22) Filed: Jan. 18, 2022

(65) Prior Publication Data

US 2022/0262123 A1    Aug. 18, 2022

(30) Foreign Application Priority Data

Feb. 17, 2021    (JP) .................................. 2021-023436

(51) Int. Cl.
*G06V 20/54*     (2022.01)
*G06F 3/0482*    (2013.01)
(Continued)

(52) U.S. Cl.
CPC ............ *G06V 20/54* (2022.01); *G06F 3/0482* (2013.01); *G06F 3/04847* (2013.01); *G06F 16/5838* (2019.01); *G06V 40/172* (2022.01)

(58) Field of Classification Search
CPC .... G06V 20/54; G06V 40/172; G06V 40/173; G06V 20/53; G06F 3/0482; G06F 3/04847; G06F 16/5838
(Continued)

(56) References Cited

U.S. PATENT DOCUMENTS 7,961,938 B1 *    6/2011  Remedios ............ G06F 16/5838
                                                     382/165
10,726,274 B1    7/2020  Hasegawa et al.
(Continued)

FOREIGN PATENT DOCUMENTS

JP    2020-028085    2/2020
JP    2020-047259    3/2020
(Continued)

OTHER PUBLICATIONS

Notice of Reasons for Refusal dated Aug. 27, 2024 issued in Japanese patent application No. 2021-023436, along with corresponding English translation.

*Primary Examiner* — Ali Bayat
(74) *Attorney, Agent, or Firm* — GREENBLUM & BERNSTEIN, P.L.C.

(57) ABSTRACT

A search support system includes at least one camera, and a server capable of communicating with the camera. The camera transmits, to the server, a captured image of the object and image color information of the captured image. The server determines whether a search condition of the captured image set by a user includes a color condition of at least one of white, black, and gray. When the color condition is included in the search condition, the server excludes a captured image associated with the image color information indicating the black-and-white image among all captured images stored in the database from a search target, and outputs a search result including a captured image satisfying the search condition. When the color condition is not included in the search condition, the server outputs a search result including a captured image satisfying the search condition among all captured images stored in the database.

7 Claims, 20 Drawing Sheets

(51) Int. Cl.
  *G06F 3/04847* (2022.01)
  *G06F 16/583* (2019.01)
  *G06V 40/16* (2022.01)
(58) Field of Classification Search
  USPC .......................................................... 382/103
  See application file for complete search history.

(56) References Cited

U.S. PATENT DOCUMENTS

| | | | |
|---|---|---|---|
| 2001/0009453 A1* | 7/2001 | Tsuchihashi | H04N 1/0044 |
| | | | 382/168 |
| 2007/0247611 A1* | 10/2007 | Tamaki | B60R 1/00 |
| | | | 348/E9.006 |
| 2010/0214398 A1* | 8/2010 | Goulart | H04N 21/6587 |
| | | | 348/61 |
| 2010/0241648 A1* | 9/2010 | Ito | G06F 16/93 |
| | | | 707/765 |
| 2014/0143085 A1 | 5/2014 | Tarbell et al. | |
| 2016/0182803 A1* | 6/2016 | Song | H04N 1/00209 |
| | | | 348/211.2 |
| 2018/0255256 A1* | 9/2018 | Park | H04N 1/40012 |
| 2020/0327347 A1 | 10/2020 | Arai et al. | |
| 2021/0297580 A1 | 9/2021 | Arai et al. | |

FOREIGN PATENT DOCUMENTS

| | | |
|---|---|---|
| JP | 2020-137069 | 8/2020 |
| JP | 2020-178167 | 10/2020 |

\* cited by examiner

FIG. 2

|  | | | | | SC1 |
|---|---|---|---|---|---|

Appearance     <<Simple     Adjust all

- HA1 → Gender   ☐ Male   ☐ Female    Low Default Hight
- HA2 → Age   ☐ 0-10   ☐ 11-20   ☑ 21-60   ☐ 61+    Low Default Hight
- HA3 → Hair type    Low Default Hight
- HA4 → Hair color    Low Default Hight   ☐ Exclude selected color
- HA5 → Tops type    Low Default Hight
- HA6 → Tops color    Low Default Hight   ☐ Exclude selected color
- HA7 → Bottoms type    Low Default Hight
- HA8 → Bottoms color    Low Default Hight   ☐ Exclude selected color
- HA9 → Glasses   ☐ Sunglasses   ☐ No Glass    Low Default Hight
- HA10 → Beard   ☐ Beard   ☐ No Beard    Low Default Hight Others
- HA11 → ☐ Recognizable face only
- HA12 → ☐ Color image only     Deselect all

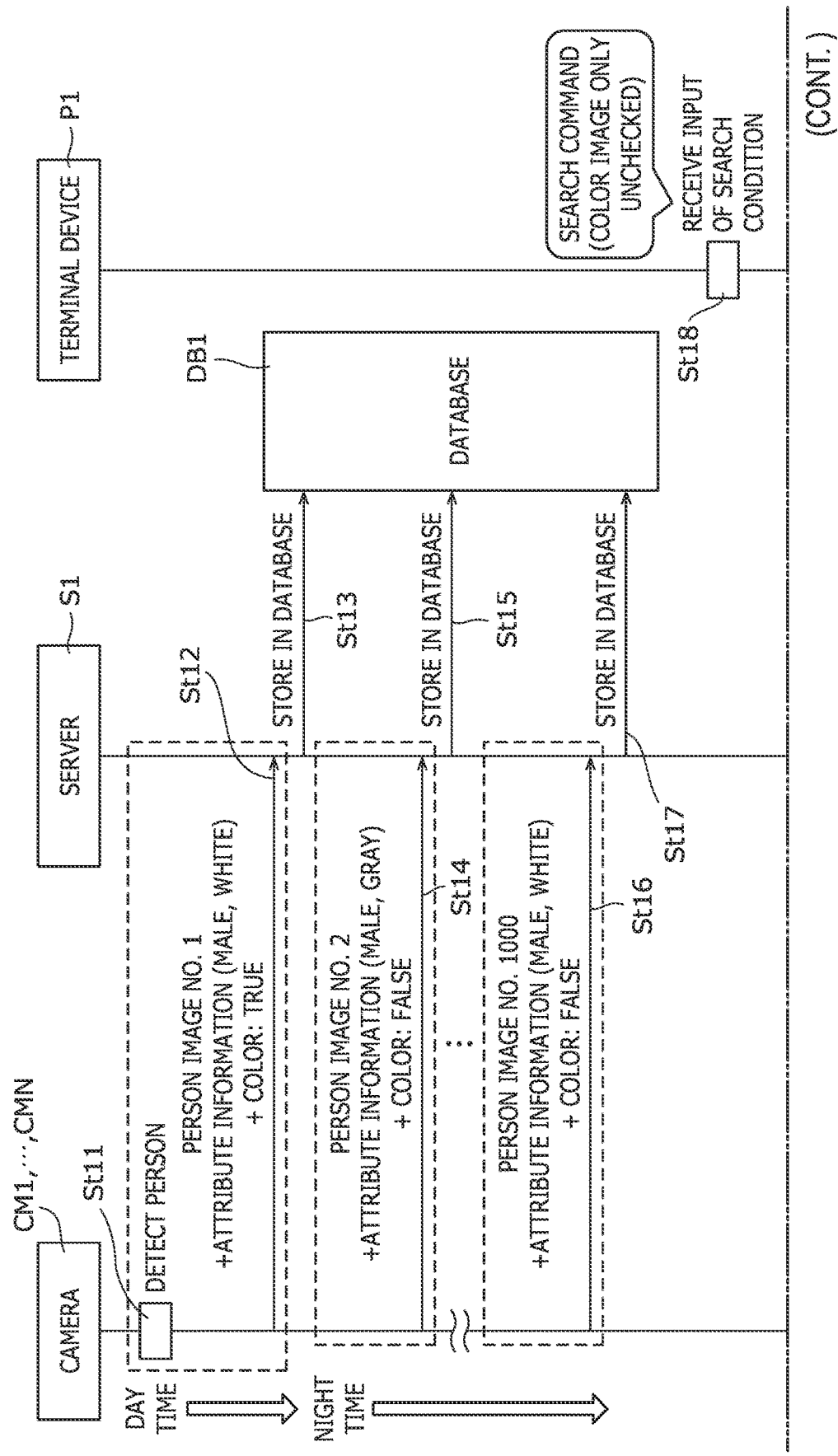

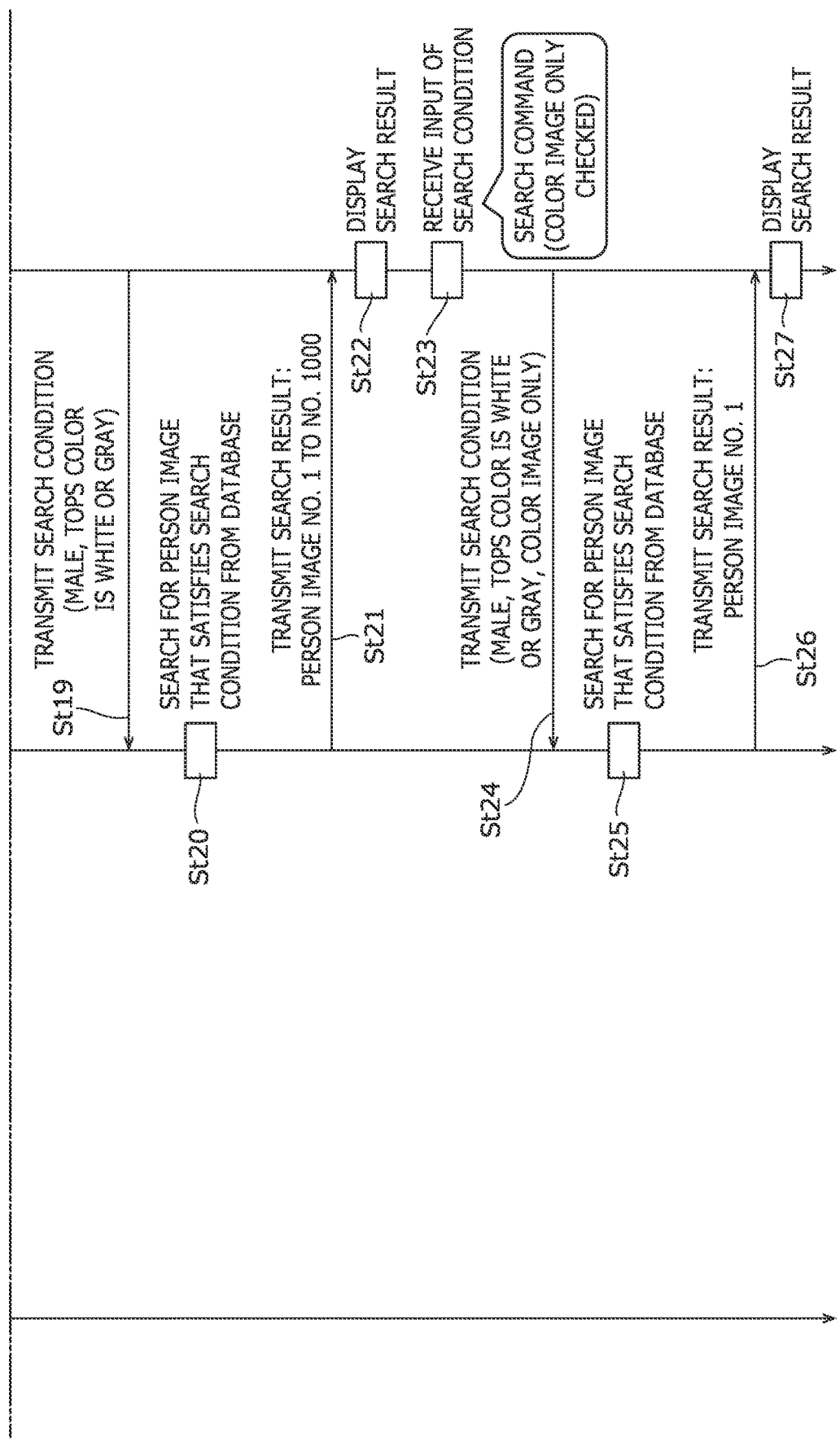

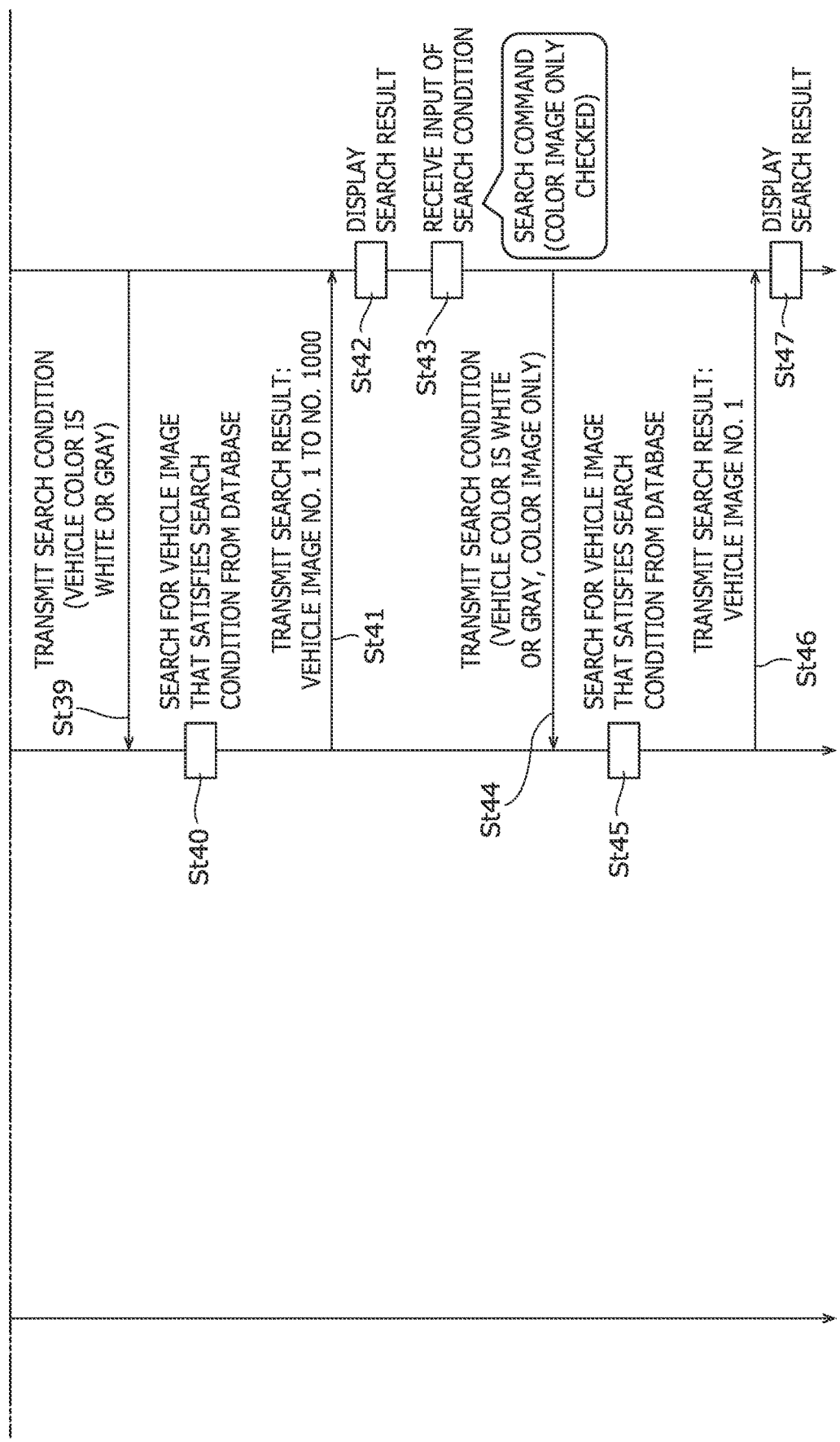

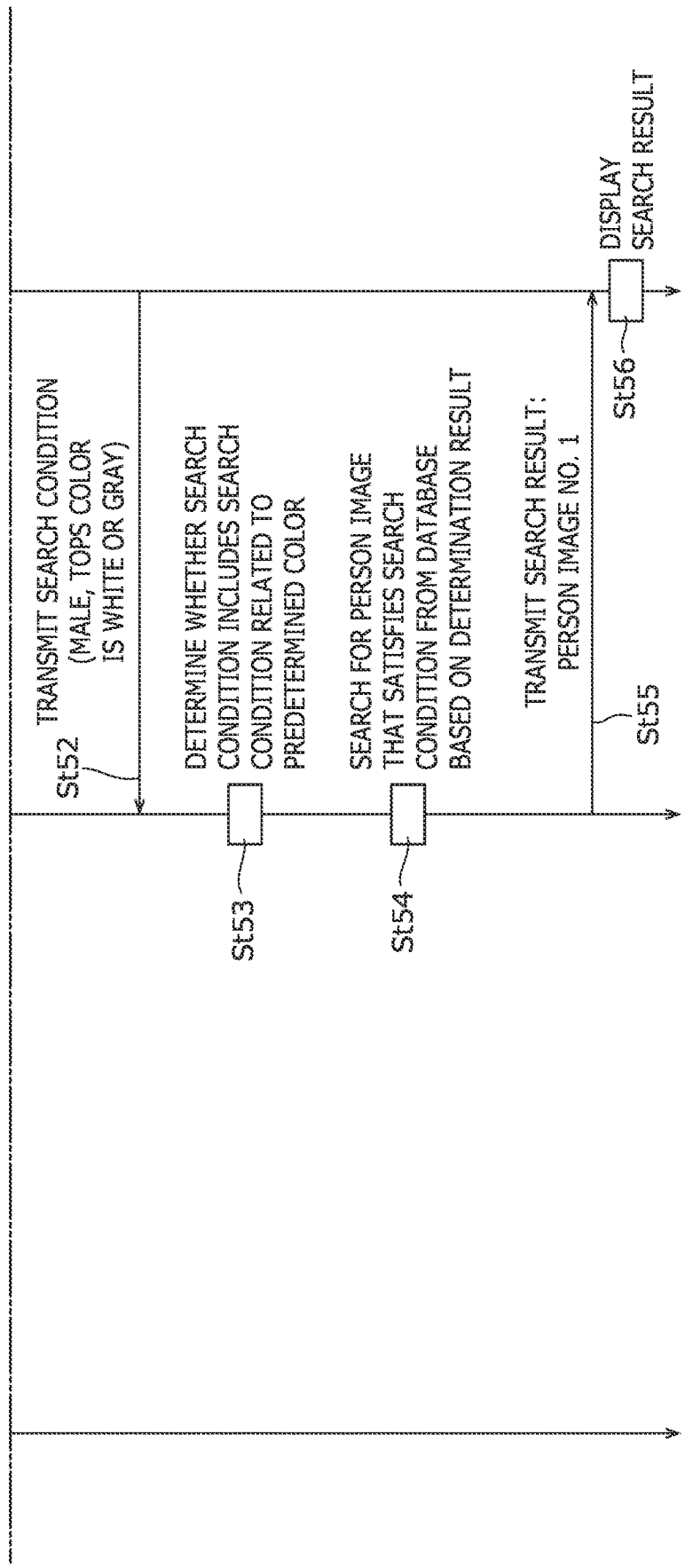

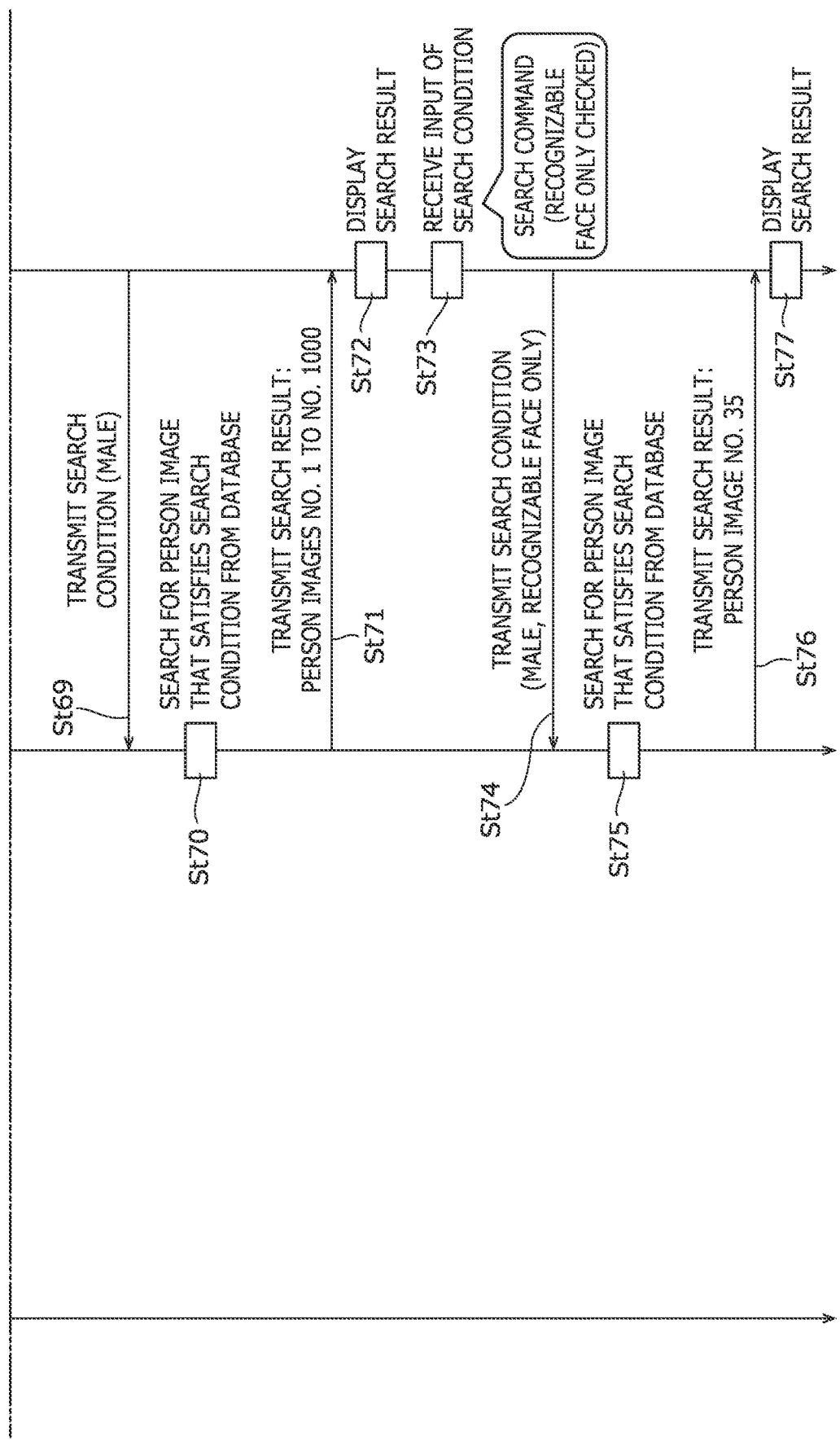

SEARCH SUPPORT SYSTEM AND SEARCH SUPPORT METHOD

CROSS-REFERENCE TO RELATED APPLICATIONS

This application is based on and claims priority under 35 USC 119 from Japanese Patent Application No. 2021-023436 filed on Feb. 17, 2021, the contents of which are incorporated herein by reference.

TECHNICAL FIELD

The present disclosure relates to a search support system, a search support method, and a search support program.

BACKGROUND ART

Patent Literature 1 discloses a person search system that analyzes position information and feature information of a person reflected in captured images of an intersection where k (k is an integer of 2 or more satisfying k≤n) cameras are installed, extracts a search target person and a moving direction of the search target person at the intersection in the captured images of (k−1) cameras using an analysis result, and superimposes and displays the moving direction of the search target person at the intersection where (k−1) cameras are installed on map data indicating the intersection where k cameras are installed. When the person search system receives different captured images transmitted from n (n is an integer of 3 or more) cameras, the person search system analyzes position information and feature information of a person reflected in each captured image and stores the position information and the feature information as an analysis result. The person search system displays, on a screen, each captured image of k cameras selected by a user operation among n cameras. Based on a search request generated in response to selection of a search target person reflected in any one of the captured images of the k cameras, the person search system extracts a moving direction of the search target person at an intersection in captured images captured by (k−1) cameras other than the camera that captures an image in which the search target person is captured in response to the search request. The person search system superimposes and displays the moving direction on map data indicating the intersection where the k cameras are installed.

CITATION LIST

Patent Literature

Patent Literature 1: JP-2020-047259-A

In the configuration disclosed Patent Literature 1 described above, when a search request for a search target is set, a user can set conditions related to colors of clothes, personal belongings, wearing objects, and the like of a search target person. However, since a camera captures a color image in a time range of daytime and a black-and-white image in a time range of nighttime, it is difficult to detect colors of clothes, personal belongings, wearing objects, and the like of the search target person from an image captured in the nighttime. Therefore, when a search request includes a condition of a color such as white, black, and gray as a condition related to colors of clothes, personal belonging, wearing objects, and the like of the search target person, the person search system may present to a user a search result including a captured image (that is, a captured image that is erroneously detected) of a person that is captured in the nighttime and has low color detection accuracy as a person satisfying such a search request. Therefore, the person search system cannot present a search result requested by a user corresponding to a search request set by the user.

SUMMARY OF INVENTION

An object of the present disclosure is to provide a search support system, a search support method, and a search support program that more appropriately search for a search target desired by a user from an image captured by a camera and more efficiently support a monitoring task of a user.

The present disclosure provides a search support system including at least one camera that captures an image of an object, and a server capable of communicating with the camera. The camera transmits, to the server, a captured image of the object and image color information indicating that the captured image is either a black-and-white image or a color image. The server stores the captured image and the image color information in association with each other in a database, and determines whether or not a search condition of the captured image set based on a user operation includes a color condition of at least one of white color, black color, and gray color. When it is determined that the search condition includes the color condition, the server excludes a captured image associated with the image color information indicating the black-and-white image among all captured images stored in the database from a search target, and generates and outputs a search result including a captured image that satisfies the search condition. When it is determined that the search condition does not include the color condition, the server generates and outputs a search result including a captured image that satisfies the search condition among all captured images stored in the database.

The present disclosure provides a search support method executed by a computer communicably connected to at least one camera that captures an image of an object. The search support method including storing a captured image of the object and image color information indicating whether the captured image is a black-and-white image or a color image in association with each other in a database; determining whether or not a search condition of the captured image set based on a user operation includes a color condition of at least one of white color, black color, and gray color; excluding a captured image associated with the image color information indicating the black-and-white image among all captured images stored in the database from a search target, generating and outputting a search result including a captured image that satisfies the search condition, when it is determined that the search condition includes the color condition; and generating and outputting a search result including a captured image that satisfies the search condition among all captured images stored in the database when it is determined that the search condition does not include the color condition.

According to the present disclosure, it is possible to more appropriately search for a search target desired by a user from an image captured by a camera and more efficiently support a monitoring task of a user.

BRIEF DESCRIPTION OF DRAWINGS

FIG. 2 is a diagram showing an example of a person search condition setting screen according to the first embodiment.

FIG. 4A is a sequence diagram showing an example of a person search procedure of the search support system according to the first embodiment.

DESCRIPTION OF EMBODIMENTS

Hereinafter, embodiments specifically disclosing configurations and operations of a search support system, a search support method, and a search support program according to the present disclosure will be described in detail with reference to the drawings as appropriate. Unnecessarily detailed description may be omitted. For example, detailed description of a well-known matter or repeated description of substantially the same configuration may be omitted. This is to avoid unnecessary redundancy in the following description and to facilitate understanding for those skilled in the art. It should be noted that the accompanying drawings and the following description are provided for a thorough understanding of the present disclosure for those skilled in the art, and are not intended to limit the subject matter recited in the claims.

First Embodiment

Figure 1:
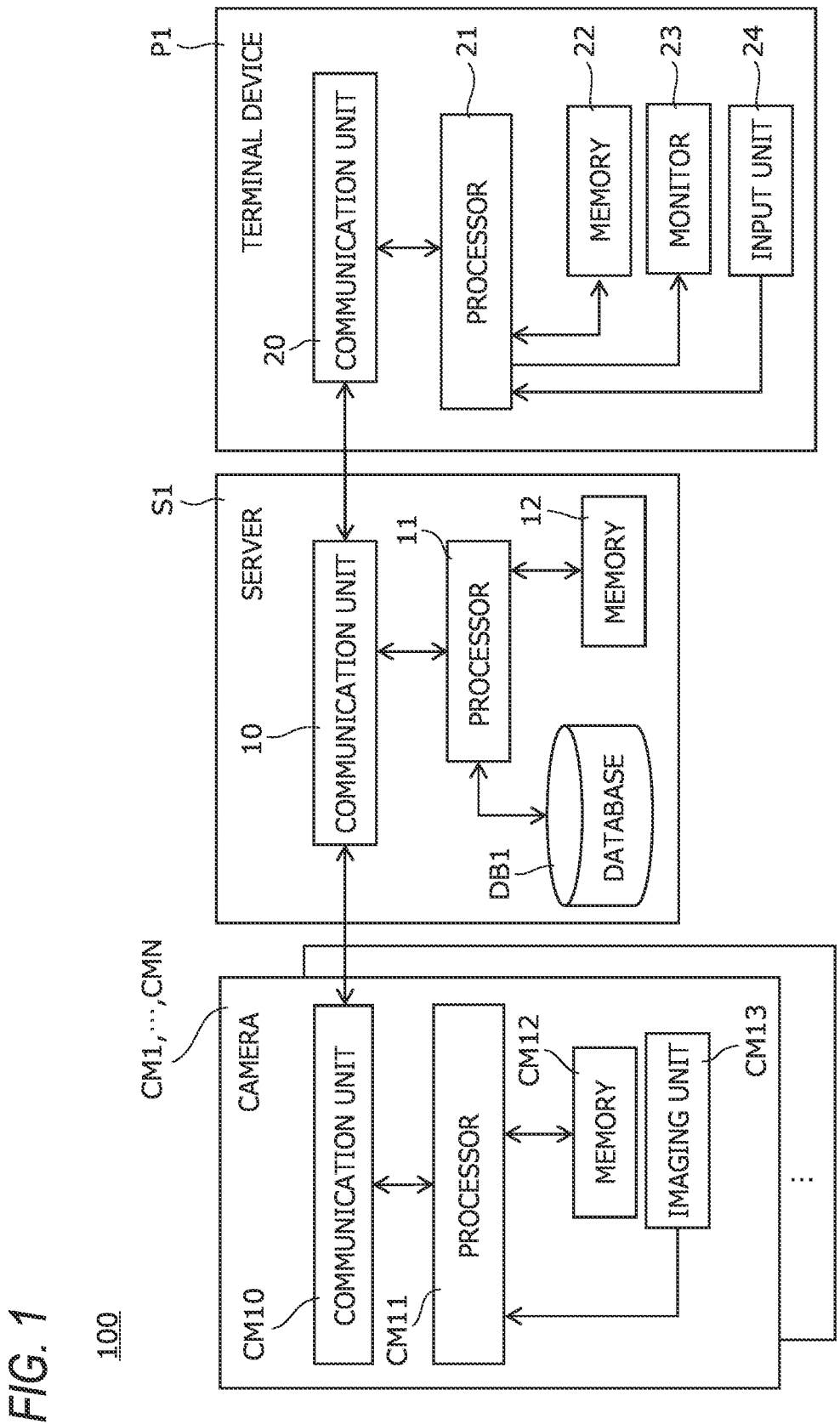
FIG. 1 is a block diagram showing an example of an internal configuration of a search support system according to a first embodiment.

FIG. 1 is a block diagram showing an example of an internal configuration of a search support system 100 according to a first embodiment. Based on a search condition set by a user, the search support system 100 searches for a captured image of an object that satisfies the search condition from images captured by cameras, and outputs a search result. The search support system 100 includes a plurality of cameras CM1 to CMN, a server S1, and a terminal device P1. A camera according to the first embodiment is, for example, a monitoring camera, and the use and type of the camera are not limited thereto. The number of cameras may be at least one. The search support system 100 may include a plurality of terminal devices P1.

Each of the plurality of cameras CM1 to CMN is installed in a manner of being capable of capturing an image of a monitoring area indoors or outdoors, and captures an image of the monitoring area. Each of the plurality of cameras CM1 to CMN is a camera equipped with artificial intelligence (AI), analyzes a captured video (captured image) captured using a learned model of AI, detects an object set by a user, and extracts a feature amount of the object, and the like. The plurality of cameras CM1 to CMN have the same configuration, and each of the plurality of cameras CM1 to CMN includes a communication unit CM10, a processor CM11, a memory CM12, and an imaging unit CM13.

The communication unit CM10 is connected to the server S1 in a manner of being capable of executing data communication with the server S1. Each of the plurality of cameras CM1 to CMN may be connected to the server S1 in a manner of being capable of executing wired communication with the server S1, or may be connected to the server S1 via a wireless network such as a wireless LAN. The wireless communication referred to here is, for example, short-range wireless communication such as Bluetooth (registered trademark) and NFC (registered trademark), or communication via a wireless local area network (LAN) such as Wi-Fi (registered trademark).

The processor CM11 is configured with, for example, a central processing unit (CPU) or a field programmable gate array (FPGA), and executes various processing and controls in cooperation with the memory CM12. Specifically, the processor CM11 achieves a function of each unit by referring to a program and data stored in the memory CM12 and executing the program. The function referred to here is a function of detecting an object (for example, a person, a vehicle, or the like) using a best shot image based on a preset application (learning model), a function of extracting a feature amount of the object, a function of determining whether a face that can be used in a face authentication (face collation) processing is detected, or the like.

The processor CM11 detects an object (for example, a person, a vehicle, or the like) in a monitoring area from captured images based on the preset application (learning model), and selects a best shot image of the detected object.

From the viewpoint of visibility or recognition and authentication processing accuracy, it is desirable to select, for example, an image in which an object (for example, a person, a vehicle, or the like) faces the front, a non-blurred image, an image in which eyes of a person are open, an image in which a license plate (number plate) of a vehicle or a two-wheeled vehicle faces the front, or the like as a best shot image.

The processor CM11 determines whether a face of a person serving as an object is reflected in the selected best shot image. When it is determined that the face of the person is reflected, the processor CM11 generates information (hereinafter, referred to as "face detection information") indicating whether the face of the person is reflected in the best shot image and whether the face that can be used in a face authentication (face collation) processing is detected. The processor CM11 extracts a feature amount (for example, attribute information of a person, attribute information of a vehicle, or the like) of the object from the selected best shot image. The processor CM11 determines whether the selected best shot image is a black-and-white image that is captured in a time range such as nighttime or is captured in a dark place, or a color image that is captured in a time range such as daytime or is captured in a bright place. When it is determined that the best shot image is a black-and-white image, the processor CM11 generates image color information indicating that the best shot image is a black-and-white image, and when it is determined that the best shot image is a color image, the processor CM11 generates image color information indicating that the best shot image is a color image.

The processor CM11 generates metadata in which the face detection information, object feature amount information (that is, attribute information of a person, attribute information of a vehicle, and the like), face detection information, and image color information are associated with one another. The processor CM11 transmits, to the server S1, detection data in which the generated metadata, a best shot image, and camera information capable of identifying a camera are further associated with one another.

The attribute information of a person referred to here includes, for example, age (era), gender, presence or absence of a mask, hair type, hair color, tops type, tops color, bottoms type, bottoms color, presence or absence of glasses, presence or absence of beard, and the like of the person. The attribute information of a vehicle includes, for example, a type of a vehicle, a color of a vehicle, a license plate number, and the like.

The memory CM12 includes, for example, a random access memory (RAM) serving as a work memory used when each processing of the processor CM11 is executed, and a read only memory (ROM) that stores a program and data for defining an operation of the processor CM11. The RAM stores data or information generated or acquired by the processor CM11. A program that defines an operation of the processor CM11 is written into the ROM.

The imaging unit CM13 includes at least a lens (not shown) and an image sensor (not shown). The image sensor is, for example, a solid-state imaging device such as a charge-coupled device (CCD) or a complementary metal-oxide-semiconductor (CMOS), and converts an optical image formed on an imaging surface into an electric signal. The imaging unit CM13 outputs a captured image to the processor CM11.

The server S1 is connected to the plurality of cameras CM1 to CMN and the terminal device P1 in a manner of being capable of executing data communication between the plurality of cameras CM1 to CMN and the terminal device P1. The server S1 may be connected to the plurality of cameras CM1 to CMN and the terminal device P1 in a manner of being capable of executing wired communication between the plurality of cameras CM1 to CMN and the terminal device P1, or may be connected to the plurality of cameras CM1 to CMN and the terminal device P1 via a wireless network such as a wireless LAN. The server S1 registers (stores) the detection data transmitted from each of the plurality of cameras CM1 to CMN in the database DB1. The server S1 searches for a best shot image or the metadata registered in the database DB1 based on a search condition transmitted from the terminal device P1, and transmits a search result of extracting the best shot image that satisfies the search condition to the terminal device P1. The server S1 includes a communication unit 10, a processor 11, a memory 12, and a database DB1. The database DB1 may be configured separately from the server S1. Further, the server S1 may include a plurality of databases DB1.

The communication unit 10 is configured with a communication interface circuit capable of executing data communication between the plurality of cameras CM1 to CMN and the terminal device P1. The communication unit 10 outputs the search condition transmitted from the terminal device P1, the detection data transmitted from each of the plurality of cameras CM1 to CMN, and the like to the processor 11. The communication unit 10 transmits the search result output from the processor 11 to the terminal device P1.

The processor 11 is configured with, for example, a CPU or an FPGA, and executes various processing and controls in cooperation with the memory 12. Specifically, the processor 11 achieves a function of each unit by referring to a program and data stored in the memory 12 and executing the program. The function of each unit here is, for example, a function of registering (storing) the detection data transmitted from each of the plurality of cameras CM1 to CMN in the database DB1, a function of searching for a best shot image that satisfies the search condition by referring to the database DB1 based on the search condition transmitted from the terminal device P1, or the like.

The memory 12 includes, for example, a RAM serving as a work memory used when each processing of the processor 11 is executed, and a ROM that stores a program and data for defining an operation of the processor 11. The RAM temporarily stores data or information generated or acquired by the processor 11. A program that defines an operation of the processor 11 is written into the ROM.

The database DB1 is configured with, for example, a hard disk drive (HDD) or a solid state drive (SSD). The database DB1 registers (stores) the detection data transmitted from each of the plurality of cameras CM1 to CMN. A plurality of databases DB1 may be provided in the server S1, or the database DB1 may be configured separately from the server S1.

The terminal device P1 is implemented by, for example, a personal computer (PC), a notebook PC, a smartphone, a tablet terminal, or the like. The terminal device P1 includes an interface (for example, a keyboard, a mouse, a touch panel display, or the like) that can receive an input operation of a user. The terminal device P1 is connected to the server S1 in a manner of being capable of executing data communication with the server S1. The terminal device P1 may be connected to the server S1 in a manner of being capable of executing wired communication with the server S1, or may be connected to the server S1 via a wireless network such as a wireless LAN. The terminal device P1 transmits a search condition generated based on an input operation of a user to the server S1, and displays a search result corresponding to the search condition transmitted from the server S1 on a monitor 23. The terminal device P1 includes a communication unit 20, a processor 21, a memory 22, a monitor 23, and an input unit 24.

The communication unit 20 is configured with a communication interface circuit capable of transmitting data to and receiving data from the server S1. The communication unit 20 transmits a search condition that is used for searching (detecting) a predetermined object and is generated by the processor 21 to the server S1 via a wireless communication network or a wired communication network, and outputs a search result transmitted from the server S1 to the processor 11.

The processor 21 is configured with, for example, a CPU or an FPGA, and executes various processing and controls in cooperation with the memory 22. Specifically, the processor 21 achieves a function of each unit by referring to a program and data stored in the memory 22 and executing the program. The function of each unit referred to here is, for example, a function of generating a search condition based on an input operation of a user input into the input unit 24, a function of displaying a search result transmitted from the server S1 on the monitor 23, or the like.

The memory 22 includes, for example, a RAM serving as a work memory used when each processing of the processor 21 is executed, and a ROM that stores data and a program for defining an operation of the processor 21. Data or information generated or acquired by the processor 21 is temporarily stored in the RAM. A program for defining an operation of the processor 21 is written into the ROM.

The monitor 23 is configured with, for example, a display such as a liquid crystal display (LCD) and an organic electroluminescence (EL). The monitor 23 displays a search condition setting screen (see FIGS. 2 and 3) for setting a search condition, a search result screen (see FIGS. 5, 6, 8, 9, 12, and 13) for displaying a search result transmitted from the server S1, and the like.

The input unit 24 is, for example, a user interface that detects an input operation of a user, and is configured with a mouse, a keyboard, a touch panel, and the like. The input unit 24 converts the received user operation into an electric signal (control command) and outputs the electric signal to the processor 21.

Here, a setting screen of a search condition related to a person serving as an object will be described with reference to FIG. 2. FIG. 2 is a diagram showing an example of a person search condition setting screen SC1 according to the first embodiment.

The search condition setting screen SC1 is a screen for setting a search condition related to attribute information of a person serving as a feature amount of an object based on a user operation. The search condition setting screen SC1 is generated by the processor 21 based on a user operation requesting for setting a search condition, and is displayed on the monitor 23.

The search condition setting screen SC1 includes a plurality of setting items related to attribute information of a person. In the example shown in FIG. 2, the search condition setting screen SC1 includes a plurality of setting items HA1, HA2, HA3, HA4, HA5, HA6, HA7, HA8, HA9, and HA10 related to the attribute information of a person, and setting items HA11 and HA12 related to a best shot image. It should be noted that the various setting items shown in FIG. 2 are merely examples, and the present invention is not limited thereto.

The setting item HA1 receives designation of a search condition "Gender" related to gender of a person. The terminal device P1 sets the gender pressed (selected) by a user operation to the setting item HA1 as the search condition. In the example shown in FIG. 2, the setting item HA1 includes two options "Male" and "Female".

The setting item HA2 receives designation of a search condition "Age" related to the age of a person. The terminal device P1 sets the age pressed (selected) by a user operation to the setting item HA2 as the search condition. In the example shown in FIG. 2, the setting item HA2 includes four options "0 to 10", "11 to 20", "21 to 60", and "61+" related to the age of a person, and "21 to 60" is selected as the search condition related to the age of a person.

The setting item HA3 receives designation of a search condition "Hair type" related to a hair type of a person. The terminal device P1 sets a hair type pressed (selected) by a user operation to the setting item HA3 as the search condition. In the example shown in FIG. 2, the setting item HA3 includes three options (specifically, long hair, short hair, skin head, and the like) related to the hair type of a person.

The setting item HA4 receives designation of a search condition "Hair color" related to a hair color of a person. The terminal device P1 sets a hair color pressed (selected) by a user operation to the setting item HA4 as the search condition. In the example shown in FIG. 2, the setting item HA4 includes five options "black", "gray", "white", "brown", and "yellow" related to the hair color of a person.

The setting item HA5 receives designation of a search condition "Tops type" related to a tops type of a person. The terminal device P1 sets a tops type pressed (selected) by a user operation to the setting item HA5 as the search condition. In the example shown in FIG. 2, the setting item HA5 includes two options "short sleeve" and "long sleeve" related to the tops type of a person.

The setting item HA6 receives designation of a search condition "Tops color" related to a tops color of a person. The terminal device P1 sets a tops color pressed (selected) by a user operation to the setting item HA6 as the search condition. In the example shown in FIG. 2, the setting item HA6 includes 11 options "black", "gray", "white", "brown", "orange", "yellow", "green", "blue", "purple", "pink", and "red" related to the tops color of a person.

The setting item HA7 receives designation of a search condition "Bottoms type" related to a bottoms type of a person. The terminal device P1 sets a bottoms type pressed (selected) by a user operation to the setting item HA7 as the search condition. In the example shown in FIG. 2, the setting item HA7 includes two options "long trousers" and "short trousers" related to the bottoms type of a person.

The setting item HA8 receives designation of a search condition "Bottoms color" related to a bottoms color of a person. The terminal device P1 sets a bottoms color pressed (selected) by a user operation to the setting item HA8 as the search condition. In the example shown in FIG. 2, the setting item HA8 includes 11 options "black", "gray", "white", "brown", "orange", "yellow", "green", "blue", "purple", "pink", and "red" related to the bottoms color of a person.

The setting item HA9 receives designation of a search condition "Glasses" related to glasses which are accessories of a person. The terminal device P1 sets the presence or absence of glasses that are accessories pressed (selected) by a user operation to the setting item HA9 as the search condition. In the example shown in FIG. 2, the setting item HA9 includes two options "Sun glasses" and "No Glass" related to the glasses that are accessories of a person.

The setting item HA10 receives designation of a search condition "Beard" related to beard of a person. The terminal device P1 sets the presence or absence of beard pressed (selected) by a user operation to the setting item HA10 as the search condition. In the example shown in FIG. 2, the setting item HA10 includes two options "Beard" and "No Beard" related to the beard of a person.

The setting item HA11 receives designation of a search condition "Recognizable face only" for designating whether to search for a best shot image that satisfies search conditions set in the plurality of setting items HA1 to HA10 from best shot images associated with the face detection information. When the search condition "Recognizable face only" is pressed (selected) by a user operation in the setting item HA11, the terminal device P1 sets a search condition for searching for a best shot image that satisfies the search conditions set in the plurality of setting items HA1 to HA10 among the best shot images associated with the face detection information. Accordingly, even when it is difficult to search for a person using a search condition related to a color, the search support system 100 can more easily search for an image in which a face of a person reflected in a best shot image can be identified in a person search by using a black-and-white image captured in the nighttime.

The setting item HA12 receives designation of a search condition "Color image only" for designating whether to search for a best shot image that satisfies the search conditions set in the plurality of setting items HA1 to HA10 from best shot images associated with the image color information indicating a color image. When the search condition "Color image only" is pressed (selected) by a user operation in the setting item HA12, the terminal device P1 sets a search condition for searching for a best shot image that satisfies the search conditions set in the plurality of setting items HA1 to HA10 among the best shot images associated with the image color information indicating a color image.

Figure 3:
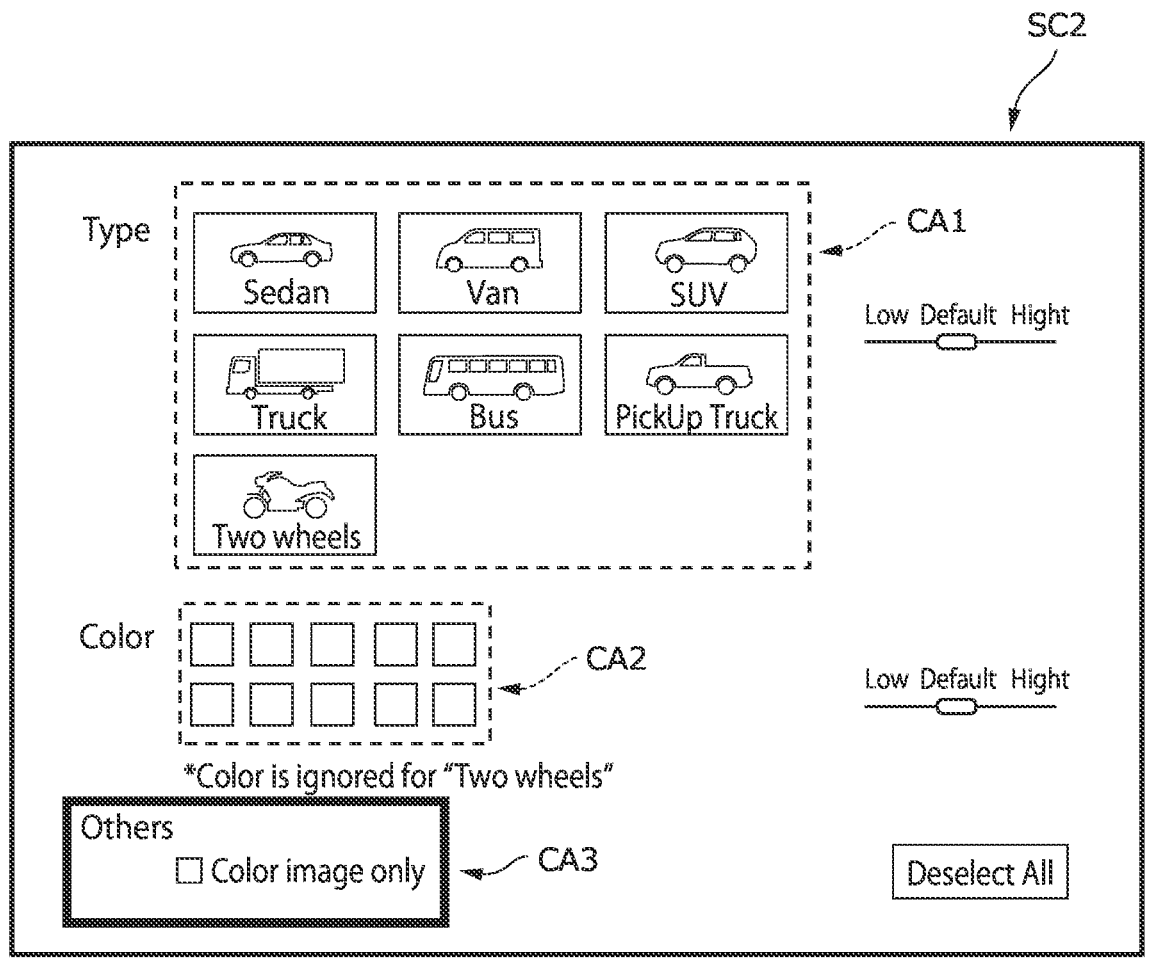
FIG. 3 is a diagram showing an example of a vehicle search condition setting screen according to the first embodiment.

A setting screen of a search condition related to a vehicle serving as an object will be described with reference to FIG. 3. FIG. 3 is a diagram showing an example of a vehicle search condition setting screen SC2 according to the first embodiment.

The search condition setting screen SC2 is a screen for setting a search condition related to attribute information of a vehicle serving as a feature amount of an object based on a user operation. The search condition setting screen SC2 is generated by the processor 21 based on a user operation requesting for setting a search condition, and is displayed on the monitor 23.

The search condition setting screen SC2 includes a plurality of setting items related to the attribute information of a vehicle. In the example shown in FIG. 3, the search condition setting screen SC2 includes a plurality of setting items CA1 and CA2 related to the attribute information of a vehicle and a setting item CA3 related to a best shot image. It should be noted that various setting items shown in FIG. 3 are merely examples, and the present invention is not limited thereto.

The setting item CA1 receives designation of a search condition "Type" related to a type of a vehicle. The terminal device P1 sets a type of a vehicle pressed (selected) by a user operation to the setting item CA1 as the search condition. In the example shown in FIG. 3, the setting item CA1 includes seven options "Sedan", "Van", "SUV", "Truck", "Bus", "PickUp Truck", and "Two wheels" related to the type of a vehicle.

The setting item CA2 receives designation of a search condition "Color" related to a color of a vehicle. The terminal device P1 sets a color of a vehicle pressed (selected) by a user operation to the setting item CA2 as the search condition. In the example shown in FIG. 3, the setting item CA2 includes ten options "black", "gray", "white", "brown", "yellow", "green", "blue", "purple", "pink", and "red" related to the color of a vehicle.

The setting item CA3 receives designation of a search condition "Color image only" for designating whether to search for a best shot image that satisfies search conditions set in the plurality of setting items CA1 and CA2 from best shot images associated with the image color information indicating a color image. When the search condition "Color image only" is pressed (selected) by a user operation in the setting item CA3, the terminal device P1 sets a search condition for searching for a best shot image that satisfies the search conditions set in the plurality of setting items CA1 and CA2 among the best shot images associated with the image color information indicating a color image.

Figure 4B:
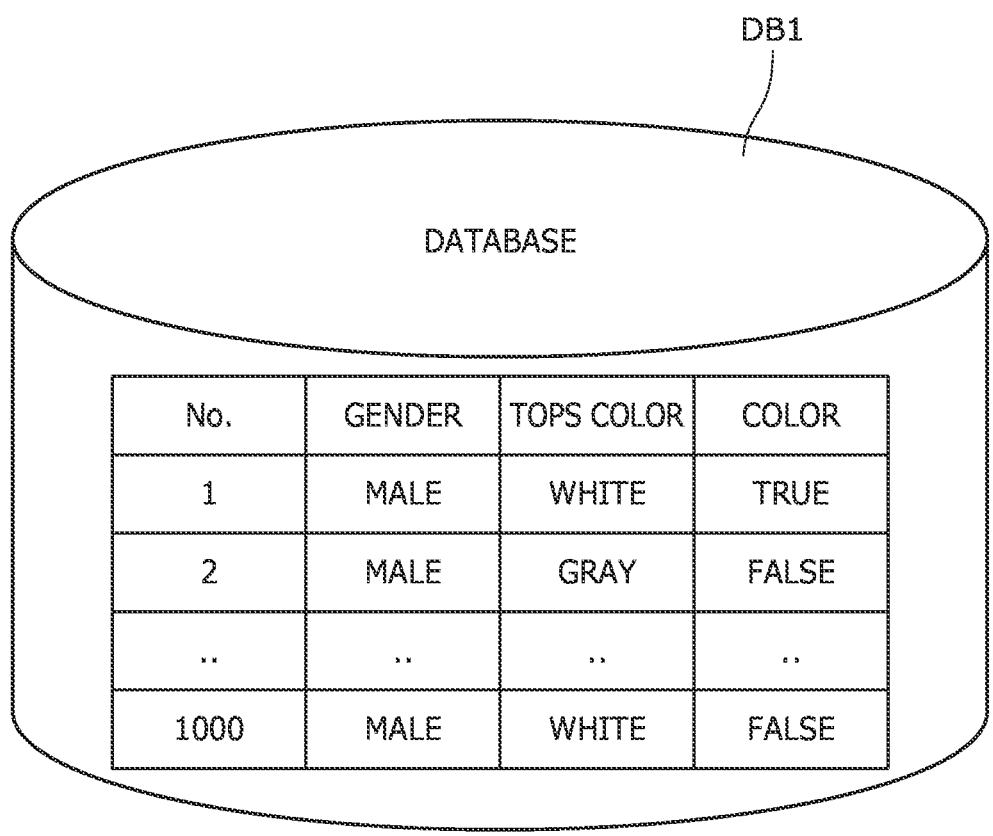
FIG. 4B is a diagram showing an example of various kinds of data registered in a database in the example of the person search procedure of the search support system according to the first embodiment.

Next, a person search procedure executed by the search support system 100 will be described with reference to FIGS. 4A and 4B. FIG. 4A is a sequence diagram showing an example of a person search procedure of the search support system 100 according to the first embodiment. FIG. 4B is a diagram showing an example of various kinds of data registered in the database DB1 in the example of the person search procedure of the search support system 100 according to the first embodiment. The sequence diagram shown in FIG. 4A is a diagram specifically showing a search procedure based on two search condition examples input in processing in step St18 and step St23 in order to facilitate understanding of the search procedure executed by the server S1 according to the first embodiment. The two search condition examples are merely examples, and it is needless to say that the present invention is not limited thereto.

Each of the plurality of cameras CM1 to CMN detects a person serving as an object based on a captured image of a monitoring area (St11). Each of the plurality of cameras CM1 to CMN selects a best shot image for each detected person serving as an object, and executes a face detection information generation determination processing (that is, a face detection information generation determination based on a determination as to whether the face of the person serving as an object is reflected in the best shot image), an object (person) feature amount extraction processing, an image color information generation processing of a best shot image, and the like based on the selected best shot image. Each of the plurality of cameras CM1 to CMN generates metadata in which the face detection information, the object feature amount information, and the image color information are associated with one another.

Each of the plurality of cameras CM1 to CMN generates detection data in which the generated metadata, the best shot image of the person, and the camera information capable of identifying a camera are associated with one another, and transmits the detection data to the server S1 (St12). The best shot image "person image No. 1" of the person transmitted to the server S1 in step St12 is a color image captured in a time range of daytime, and indicates an example in which the gender "male" and the tops color "white" that are the attribute information of the person serving as object feature amount information are associated with the image color information "TRUE". The image color information "TRUE" referred to here indicates that the best shot image "person image No. 1" is a color image.

The server S1 stores (registers) the best shot image "person image No. 1" transmitted from each of the plurality of cameras CM1 to CMN in the database DB1 (St13).

Each of the plurality of cameras CM1 to CMN detects a person serving as an object based on a captured image of a monitoring area (see the processing in step St11 in a broken line portion shown in FIG. 4A). Each of the plurality of cameras CM1 to CMN generates detection data in which the generated metadata, the best shot image of the person, and the camera information capable of identifying a camera are associated with one another, and transmits the detection data to the server S1 (St14). The best shot image "person image No. 2" of the person transmitted to the server S1 in step St14 is a black-and-white image captured in a time range of nighttime, and indicates an example in which the gender "male" and the tops color "grey" that are the attribute information of the person serving as object feature amount information are associated with the image color information "FALSE". The image color information "FALSE" referred to here indicates that the best shot image "person image No. 2" is a black-and-white image.

The server S1 stores (registers) the best shot image "person image No. 2" transmitted from each of the plurality of cameras CM1 to CMN in the database DB1 (St15).

Similarly, each of the plurality of cameras CM1 to CMN detects a person serving as an object based on a captured image of a monitoring area (see the processing of step St11 in the broken line portion shown in FIG. 4A). Each of the plurality of cameras CM1 to CMN generates detection data in which the generated metadata, the best shot image of the person, and the camera information capable of identifying a camera are associated with one another, and transmits the detection data to the server S1 (St16). The best shot image "person image No. 1000" of the person transmitted to the server S1 in step St16 is a black-and-white image captured in a time range of nighttime, and indicates an example in which the gender "male" and the tops color "white" that are the attribute information of the person serving as object feature amount information are associated with the image color information "FALSE". The image color information "FALSE" referred to here indicates that the best shot image "person image No. 1000" is a black-and-white image.

The server S1 stores (registers) the best shot image "person image No. 1000" transmitted from each of the plurality of cameras CM1 to CMN in the database DB1 (St17).

Through the processing in steps St11 to St17 described above, the database DB1 shown in FIG. 4B stores (registers) the number of the best shot image ("No." shown in FIG. 4B), the gender information "male" of the person, the tops color "white" or "gray" of the person, the image color information "TRUE" or "FALSE" of the best shot image, and 1000 best shot images in association with one another. The best shot images shown in FIGS. 4A and 4B and metadata (for example, face detection information, a feature amount of a person, image color information, and the like) associated with each of the best shot images are merely examples, and it is needless to say that the present invention is not limited thereto. In order to make the description easy to understand, a search procedure of a best shot image that satisfies a search condition using each of the 1000 best shot images registered in the database DB1 shown in FIG. 4A will be specifically described in the following description of processing in steps St18 to St27. In FIGS. 4A and 4B, in best shot images corresponding to the numbers "No. 3" to "No. 999", the attribute information of the person is gender "male", the tops color of the person is "white" or "gray", and the image color information is "FALSE", and description and illustration thereof are omitted.

The terminal device P1 receives an input (setting) operation of a search condition from a user using the input unit 24 (St18). Here, an example of the search condition set in step St18 shown in FIG. 4A will be described in which the search condition "Color image only" is not set (invalidated) and a condition related to an object feature amount is that the gender of the person is "male" and the tops color is "white" or "gray". The terminal device P1 transmits the set search condition (the gender of the person is "male" and the tops color is "white" or "gray") to the server S1 (St19).

Based on the search condition transmitted from the terminal device P1, the server S1 refers to the object feature amount (here, the attribute information of the person) associated with each of the plurality of best shot images stored (registered) in the database DB1, and searches for a person image (that is, a best shot image) that satisfies the search condition (St20). Here, the server S1 in the example shown in FIG. 4A collates the metadata associated with each of the 1000 best shot images registered in the database DB1 with the search condition (specifically, the gender of the person is "male" and the tops color is "white" or "gray"), and searches for a person image (a best shot image) that is determined satisfying the search condition. The server S1 generates search result data based on the person image (the best shot image) that is determined satisfying the search condition, and transmits the generated search result data (here, each of the 1000 best shot images associated with the numbers "No. 1" to "No. 1000") to the terminal device P1 (St21).

The terminal device P1 displays the search result data transmitted from the server S1 (that is, the 1000 best shot images associated with the numbers "No. 1" to "No. 1000") on the monitor 23 (St22).

The terminal device P1 receives an input (setting) operation of a search condition from a user using the input unit 24 (St23). Here, an example of the search condition set in step St23 shown in FIG. 4A will be described in which the search condition "Color image only" is set (validated) and a condition related to an object feature amount is that the gender of the person is "male" and the tops color is "white" or "gray". The terminal device P1 transmits the set search condition (the best shot image is a color image, the gender of the person is "male", and the tops color is "white" or "gray") to the server S1 (St24).

Based on the search condition transmitted from the terminal device P1, the server S1 refers to the object feature amount (here, the attribute information of the person) associated with each of the plurality of best shot images stored (registered) in the database DB1, and searches for a person image (that is, a best shot image) that satisfies the search condition (St25). Here, the server S1 in the example shown in FIG. 4A collates the metadata associated with each of the 1000 best shot images registered in the database DB1 with the search condition (specifically, the best shot image is a color image, the gender of the person is "male" and the tops color is "white" or "gray"), and searches for a person image (a best shot image) that is determined satisfying the search condition. The server S1 generates search result data based on the person image (the best shot image) that is determined satisfying the search condition, and transmits the generated search result data (here, one best shot image associated with the number "No. 1") to the terminal device P1 (St26).

The terminal device P1 displays the search result data transmitted from the server S1 (that is, one best shot image associated with the number "No. 1") on the monitor 23 (St27).

As described above, the search support system 100 according to the first embodiment invalidates or validates the search condition "Color image only", so as to determine whether to exclude a best shot image that is not a color image (that is, the best shot image whose image color information indicates a black-and-white image) from a search target. Accordingly, when the search condition "Color image only" is validated, the search support system 100 can output a search result excluding a best shot image that is not a color image (that is, the best shot image whose image color information indicates a black-and-white image). Accordingly, the search support system 100 can identify feature amount information related to a color extracted from a color image (for example, white, black, gray, and the like) and feature amount information related to a color extracted from a black-and-white image (for example, white, black, gray, and the like), and can output a search result more suitable for a search condition.

Figure 5:
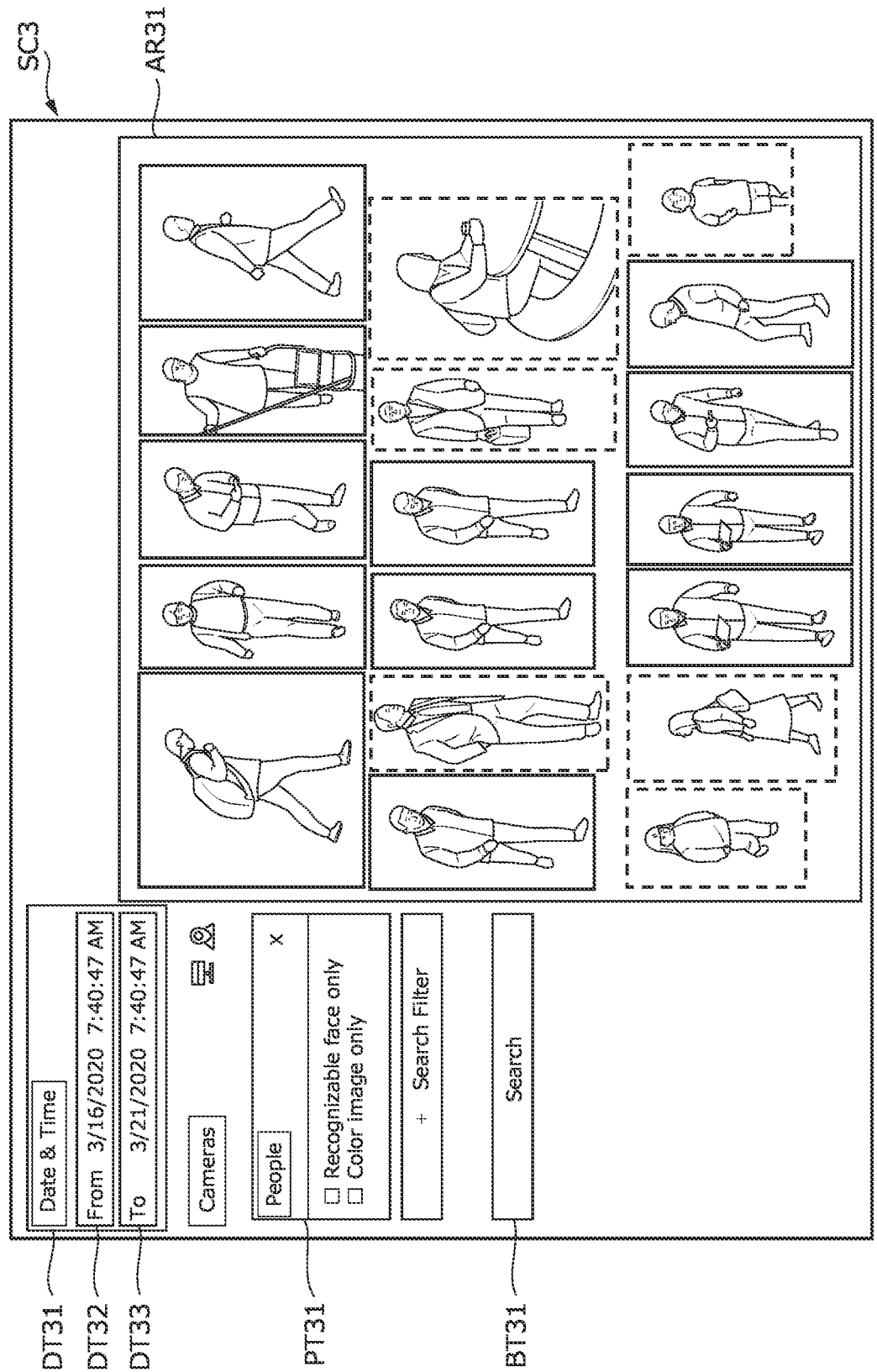
FIG. 5 is a diagram showing an example of a person search result screen including a black-and-white image.
Figure 6:
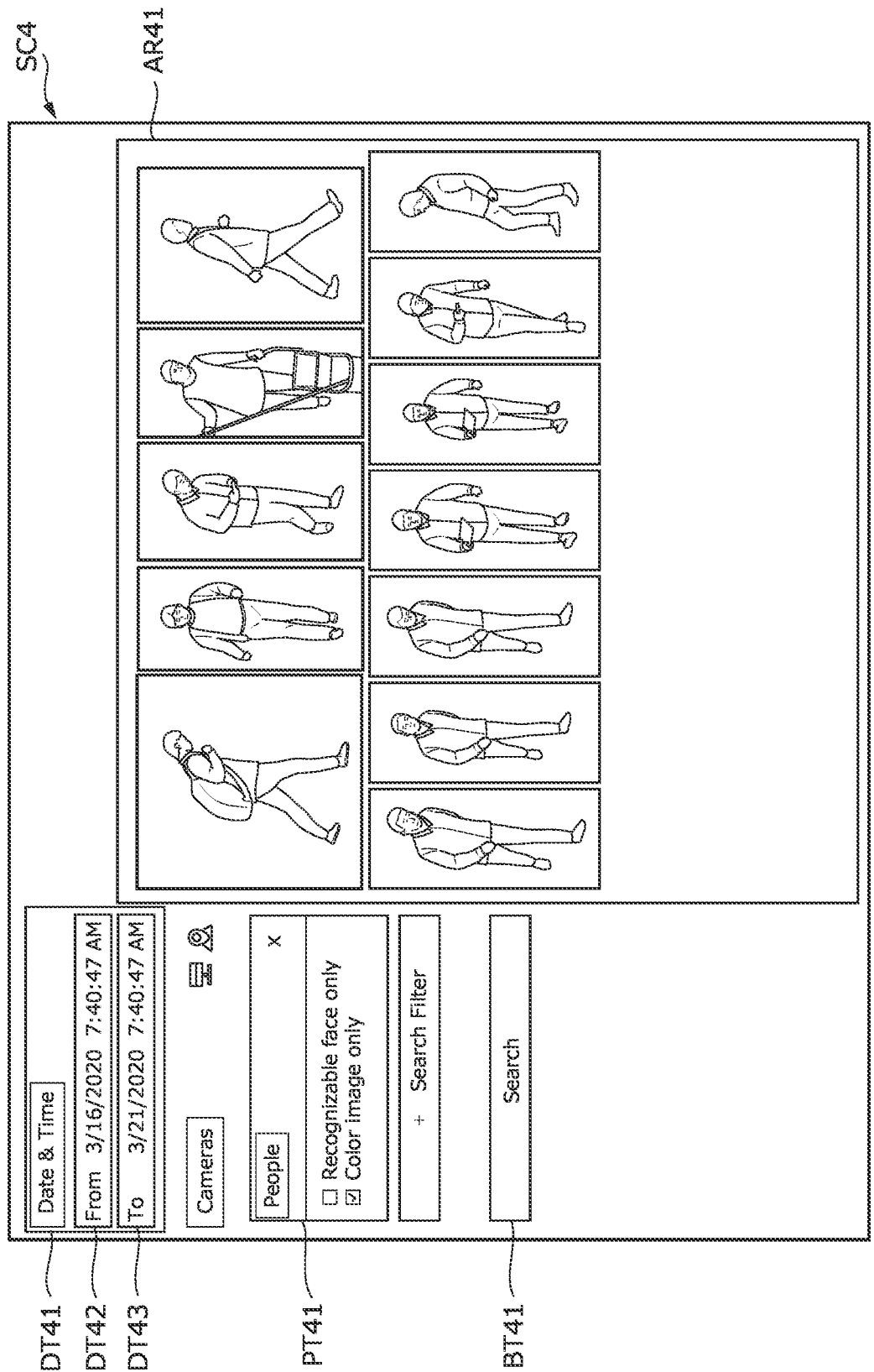
FIG. 6 is a diagram showing an example of a person search result screen excluding a black-and-white image.

Next, search result screens SC3 and SC4 displayed on the terminal device P1 will be described with reference to FIGS. 5 and 6. FIG. 5 is a diagram showing an example of the person search result screen SC3 including a black-and-white image. FIG. 6 is a diagram showing an example of the person search result screen SC4 excluding a black-and-white image. The search result screens SC3 and SC4 shown in FIGS. 5 and 6 are merely examples, and it is needless to say that the present invention is not limited thereto.

Although the search result screens SC3 and SC4 shown in FIGS. 5 and 6 include input fields of search conditions related to imaging date and time, face detection information, and image color information, these search conditions may be set on the search condition setting screen SC1 (see FIG. 2). Further, on the search result screens SC3 and SC4 shown in FIGS. 5 and 6, search conditions corresponding to various setting items shown on the search condition setting screen SC1 (see FIG. 2) may be set by "Search Filter". Specifically, when "Search Filter" is selected (pressed) by a user operation on the search result screens SC3 and SC4, the terminal device P1 may display a setting field (not shown) capable of setting search conditions corresponding to various setting items shown on the search condition setting screen SC1 (see FIG. 2) and receive an input of a search condition based on a user operation, or the terminal device P1 may shift to the search condition setting screen SC1 (see FIG. 2) and receive an input of a search condition based on a user operation.

The search result screen SC3 shown in FIG. 5 is generated based on the search result data transmitted from the server S1 by the terminal device P1, and is displayed on the monitor 23. Specifically, the search result screen SC3 includes an imaging date and time setting field DT31, a person search condition field PT31, a search button BT31, and a search result display region AR31.

The imaging date and time setting field DT31 receives an input operation of a user for a search condition related to imaging date and time when a best shot image is captured or a period of imaging date and time. The terminal device P1 sets a search condition based on the information of the imaging date and time input to imaging start date and time DT32 and imaging end date and time DT33. In the example shown in FIG. 5, the terminal device P1 sets a search condition for searching for best shot images from "Mar. 16, 2020 7:40:47 AM" input to the imaging start date and time DT32 to "Mar. 21, 2020 7:40:47 AM" input to the imaging end date and time DT33.

The person search condition field PT31 receives an input operation of a user for setting a search condition "Recognizable face only" and a search condition "Color image only" related to a person serving as an object. The terminal device P1 sets search conditions selected (pressed) by a user operation. In the example shown in FIG. 5, the terminal device P1 sets a search condition of invalidating the search condition "Recognizable face only" and the search condition "Color image only".

The search button BT31 is a button for requesting the server S1 to execute a search processing based on the search conditions set in the imaging date and time setting field DT31 and the person search condition field PT31. When the search button BT31 is pressed (selected) by a user, the terminal device P1 generates search conditions set in the imaging date and time setting field DT31 and the person search condition field PT31, and a control command for requesting a search based on the search conditions, and transmits the generated search conditions and control command to the server S1.

The search result display region AR31 displays a list of best shot images included in search result data that is searched and transmitted by the server S1, based on the search conditions set in the imaging date and time setting field DT31 and the person search condition field PT31.

The search result display region AR31 shown in FIG. 5 displays 18 best shot images as a search result based on the search conditions set in the imaging date and time setting field DT31 and the person search condition field PT31. In the search result display region AR31 shown in FIG. 5, 12 best shot images surrounded by solid line frames are color images. Similarly, six best shot images surrounded by broken line frames are black-and-white images.

The search result screen SC4 shown in FIG. 6 is generated based on the search result data transmitted from the server S1 by the terminal device P1, and is displayed on the monitor 23. Specifically, the search result screen SC4 includes an imaging date and time setting field DT41, a person search condition field PT41, a search button BT41, and a search result display region AR41.

The imaging date and time setting field DT41 receives an input operation of a user for a search condition related to imaging date and time when a best shot image is captured or a period of imaging date and time. The terminal device P1 sets a search condition based on the information of the imaging date and time input to imaging start date and time DT42 and imaging end date and time DT43. In the example shown in FIG. 6, the terminal device P1 sets a search condition for searching for best shot images from "Mar. 16, 2020 7:40:47 AM" input to the imaging start date and time DT42 to "Mar. 21, 2020 7:40:47 AM" input to the imaging end date and time DT43.

The person search condition field PT41 receives an input operation of a user for setting a search condition "Recognizable face only" and a search condition "Color image only" related to a person serving as an object. The terminal device P1 sets search conditions selected (pressed) by a user operation. In the example shown in FIG. 6, the terminal device P1 sets a search condition of invalidating the search condition "Recognizable face only" and validating the search condition "Color image only".

The search button BT41 is a button for requesting the server S1 to execute a search processing based on the search conditions set in the imaging date and time setting field DT41 and the person search condition field PT41. When the search button BT41 is pressed (selected) by a user, the terminal device P1 generates search conditions set in the imaging date and time setting field DT41 and the person search condition field PT41, and a control command for requesting a search based on the search conditions, and transmits the generated search conditions and control command to the server S1.

The search result display region AR41 displays a list of best shot images included in search result data that is searched and transmitted by the server S1, based on the search conditions set in the imaging date and time setting field DT41 and the person search condition field PT41.

The search result display region AR41 shown in FIG. 6 displays 12 best shot images as a search result based on the search conditions set in the imaging date and time setting field DT41 and the person search condition field PT41. In the search result display region AR41 shown in FIG. 6, 12 best shot images surrounded by solid line frames are color images.

As described above, the search support system 100 according to the first embodiment invalidates or validates the search condition "Color image only", so as to determine whether to exclude a best shot image that is not a color image (that is, a best shot image whose image color information indicates a black-and-white image) from a search target. Accordingly, when the search condition "Color image only" is validated, the search support system 100 can output a search result excluding a best shot image that is not a color image (that is, a best shot image whose image color information indicates a black-and-white image). Accordingly, the search support system 100 can identify feature amount information related to a color extracted from a color image (for example, white, black, gray, and the like) and feature amount information related to a color extracted from a black-and-white image (for example, white, black, gray, and the like), and can output a search result more suitable for a search condition.

Figure 7A:
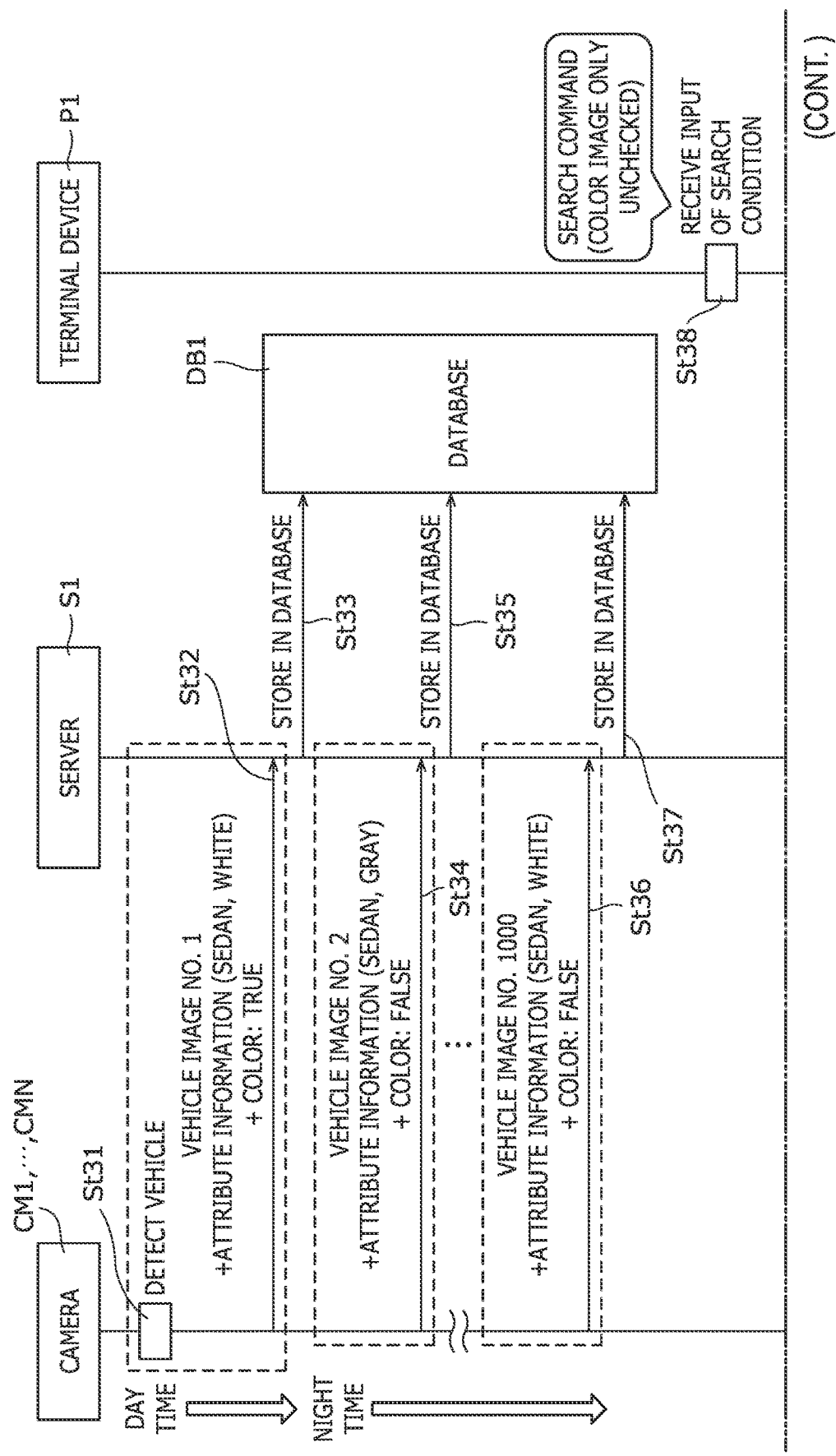
FIG. 7A is a sequence diagram showing an example of a vehicle search procedure of the search support system according to the first embodiment.
Figure 7B:
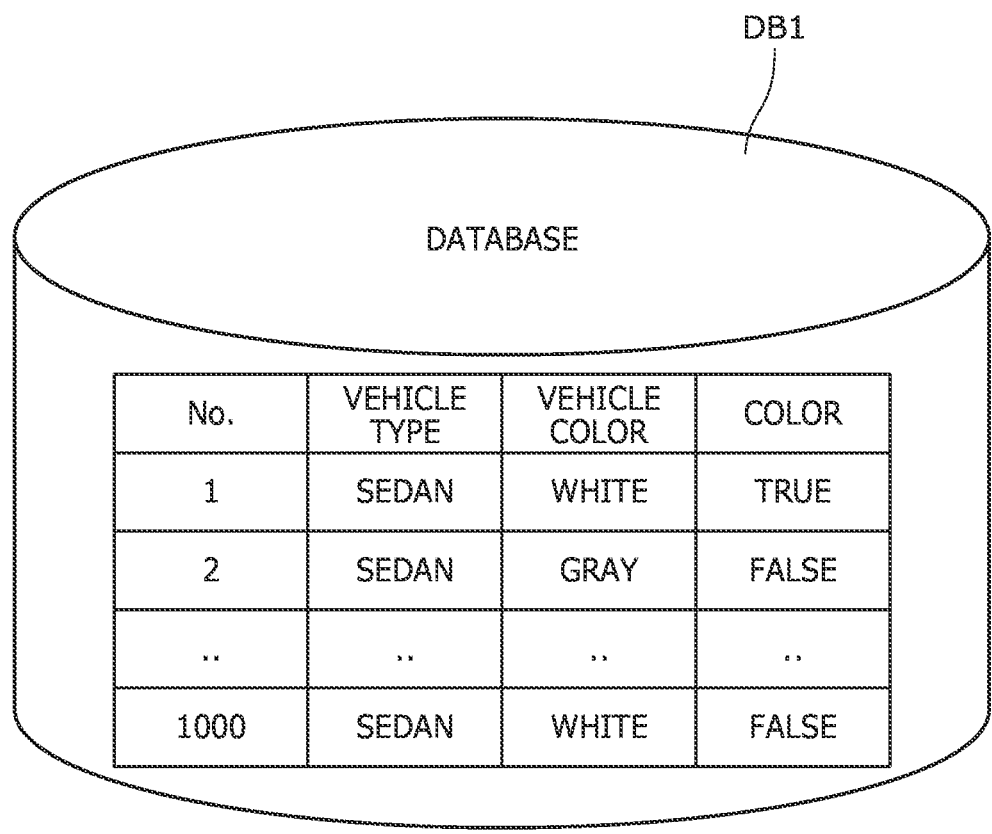
FIG. 7B is a diagram showing an example of various kinds of data registered in a database in the example of the vehicle search procedure of the search support system according to the first embodiment.

Next, a vehicle search procedure executed by the search support system 100 will be described with reference to FIGS. 7A and 7B. FIG. 7A is a sequence diagram showing an example of a vehicle search procedure of the search support system 100 according to the first embodiment. FIG. 7B is a diagram showing an example of various kinds of data registered in the database DB1 in the example of the vehicle search procedure of the search support system 100 according to the first embodiment. The sequence diagram shown in FIG. 7A is a diagram specifically showing a search procedure based on two search condition examples input in processing in step St38 and step St43 in order to facilitate understanding of the search procedure executed by the server S1 according to the first embodiment. The two search condition examples are merely examples, and it is needless to say that the present disclosure is not limited thereto.

Each of the plurality of cameras CM1 to CMN detects a vehicle serving as an object based on a captured image of a monitoring area (St31). Each of the plurality of cameras CM1 to CMN selects a best shot image for each detected vehicle serving as an object, and executes an object (vehicle) feature amount extraction processing, an image color information generation processing of a best shot image, and the like based on the selected best shot image. Each of the plurality of cameras CM1 to CMN generates metadata in which the vehicle detection information, the object feature amount information and the image color information are associated with each other.

Each of the plurality of cameras CM1 to CMN generates detection data in which the generated metadata, a best shot image of a vehicle, and camera information capable of identifying a camera are associated with one another, and transmits the detection data to the server S1 (St32). The best shot image "vehicle image No. 1" of a vehicle transmitted to the server S1 in step St32 is a color image captured in a time range of daytime, and indicates an example in which the vehicle type "sedan" and the vehicle color "white" that are attribute information of the vehicle serving as object feature amount information are associated with the image color information "TRUE". The image color information "TRUE" referred to here indicates that the best shot image "vehicle image No. 1" is a color image.

The server S1 stores (registers) the best shot image "vehicle image No. 1" transmitted from each of the plurality of cameras CM1 to CMN in the database DB1 (St33).

Each of the plurality of cameras CM1 to CMN detects a vehicle serving as an object based on a captured image of a monitoring area (see the processing in step St31 in a broken line portion shown in FIG. 7A). Each of the plurality of cameras CM1 to CMN generates detection data in which the generated metadata, a best shot image of a vehicle, and camera information capable of identifying a camera are associated with one another, and transmits the detection data to the server S1 (St34). The best shot image "vehicle image No. 2" of a vehicle transmitted to the server S1 in step St34 is a black-and-white image captured in a time range of nighttime, and indicates an example in which the vehicle type "sedan" and the vehicle color "grey" that are attribute information of the vehicle serving as object feature amount information are associated with the image color information "FALSE". The image color information "FALSE" referred to here indicates that the best shot image "vehicle image No. 2" is a black-and-white image.

The server S1 stores (registers) the best shot image "vehicle image No. 2" transmitted from each of the plurality of cameras CM1 to CMN in the database DB1 (St35).

Similarly, each of the plurality of cameras CM1 to CMN detects a vehicle serving as an object based on a captured image of a monitoring area (see the processing in step St31 in a broken line portion shown in FIG. 7A). Each of the plurality of cameras CM1 to CMN generates detection data in which the generated metadata, a best shot image of a vehicle, and camera information capable of identifying a camera are associated with one another, and transmits the detection data to the server S1 (St36). The best shot image "vehicle image No. 1000" of a vehicle transmitted to the server S1 in step St36 is a black-and-white image captured in a time range of nighttime, and indicates an example in which the vehicle type "sedan" and the vehicle color "white" that are attribute information of the vehicle serving as object feature amount information are associated with the image color information "FALSE". The image color information "FALSE" referred to here indicates that the best shot image "vehicle image No. 1000" is a black-and-white image.

The server S1 stores (registers) the best shot image "vehicle image No. 1000" transmitted from each of the plurality of cameras CM1 to CMN in the database DB1 (St37).

Through the processing in steps St31 to St37 described above, the database DB1 shown in FIG. 7B stores (registers) the number of a best shot image ("No." shown in FIG. 7B), vehicle type information "sedan", vehicle color "white" or "gray", image color information "TRUE" or "FALSE" of a best shot image, and 1000 best shot images in association with one another. The best shot images shown in FIGS. 7A and 7B and metadata (for example, a feature amount of a vehicle, image color information, and the like) associated with each of the best shot images are merely examples, and it is needless to say that the present invention is not limited thereto. In order to make the description easy to understand, a search procedure of a best shot image that satisfies a search condition using each of the 1000 best shot images registered in the database DB1 shown in FIG. 7B will be specifically described in the following description of processing in steps St38 to St47. In FIGS. 7A and 7B, in best shot images corresponding to the numbers "No. 3" to "No. 999", vehicle type information is "sedan", vehicle color is "white" or "gray", and image color information of a best shot image is "FALSE", and description and illustration thereof are omitted.

The terminal device P1 receives an input (setting) operation of a search condition from a user using the input unit 24 (St38). Here, an example of the search condition set in step St38 shown in FIG. 7A will be described in which the search condition "Color image only" is not set (invalidated) and a condition related to an object feature amount is that a vehicle type is "sedan" and a vehicle color is "white" or "gray". The terminal device P1 transmits the set search condition (the vehicle type is "sedan" and the vehicle color is "white" or "gray") to the server S1 (St39).

Based on the search condition transmitted from the terminal device P1, the server S1 refers to the object feature amount (here, the attribute information of the vehicle) associated with each of the plurality of best shot images stored (registered) in the database DB1, and searches for a vehicle image (that is, a best shot image) that satisfies the search condition (St40). Here, the server S1 in the example shown in FIG. 7A collates the metadata associated with each of the 1000 best shot images registered in the database DB1 with a search condition (specifically, the vehicle type is "sedan" and the vehicle color is "white" or "gray"), and searches for a vehicle image (a best shot image) that is determined satisfying the search condition. The server S1 generates search result data based on the vehicle image (the best shot image) that is determined satisfying the search condition, and transmits the generated search result data (here, the 1000 best shot images associated with the numbers "No. 1" to "No. 1000") to the terminal device P1 (St41).

The terminal device P1 displays the search result data transmitted from the server S1 (that is, the 1000 best shot images associated with the numbers "No. 1" to "No. 1000") on the monitor 23 (St42).

The terminal device P1 receives an input (setting) operation of a search condition from a user using the input unit 24 (St43). Here, an example of the search condition set in step St43 shown in FIG. 7A will be described in which the search condition "Color image only" is set (validated) and a condition related to an object feature amount is that a vehicle type is "sedan" and a vehicle color is "white" or "gray". The terminal device P1 transmits the set search condition (the best shot image is a color image, the vehicle type is "sedan" and the vehicle color is "white" or "gray") to the server S1 (St44).

Based on the search condition transmitted from the terminal device P1, the server S1 refers to the object feature amount (here, the attribute information of the vehicle) associated with each of the plurality of best shot images stored (registered) in the database DB1, and searches for a vehicle image (that is, a best shot image) that satisfies the search condition (St45). Here, the server S1 in the example shown in FIG. 7A collates the metadata associated with each of the 1000 best shot images registered in the database DB1 with a search condition (specifically, the best shot image is a color image, the vehicle type is "sedan" and the vehicle color is "white" or "gray"), and searches for a vehicle image (a best shot image) that is determined satisfying the search condition. The server S1 generates search result data based on the vehicle image (the best shot image) that is determined satisfying the search condition, and transmits the generated search result data (here, one best shot images associated with the number "No. 1") to the terminal device P1 (St46).

The terminal device P1 displays the search result data transmitted from the server S1 (that is, one best shot image associated with the number "No. 1") on the monitor 23 (St47).

As described above, the search support system 100 according to the first embodiment invalidates or validates the search condition "Color image only", so as to determine whether to exclude a best shot image that is not a color image (that is, a best shot image whose image color information indicates a black-and-white image) from a search target. Accordingly, when the search condition "Color image only" is validated, the search support system 100 can output a search result excluding a best shot image that is not a color image (that is, a best shot image whose image color information indicates a black-and-white image). Accordingly, the search support system 100 can identify feature amount information related to a color extracted from a color image (for example, white, black, gray, and the like) and feature amount information related to a color extracted from a black-and-white image (for example, white, black, gray, and the like), and can output a search result more suitable for a search condition.

Figure 8:
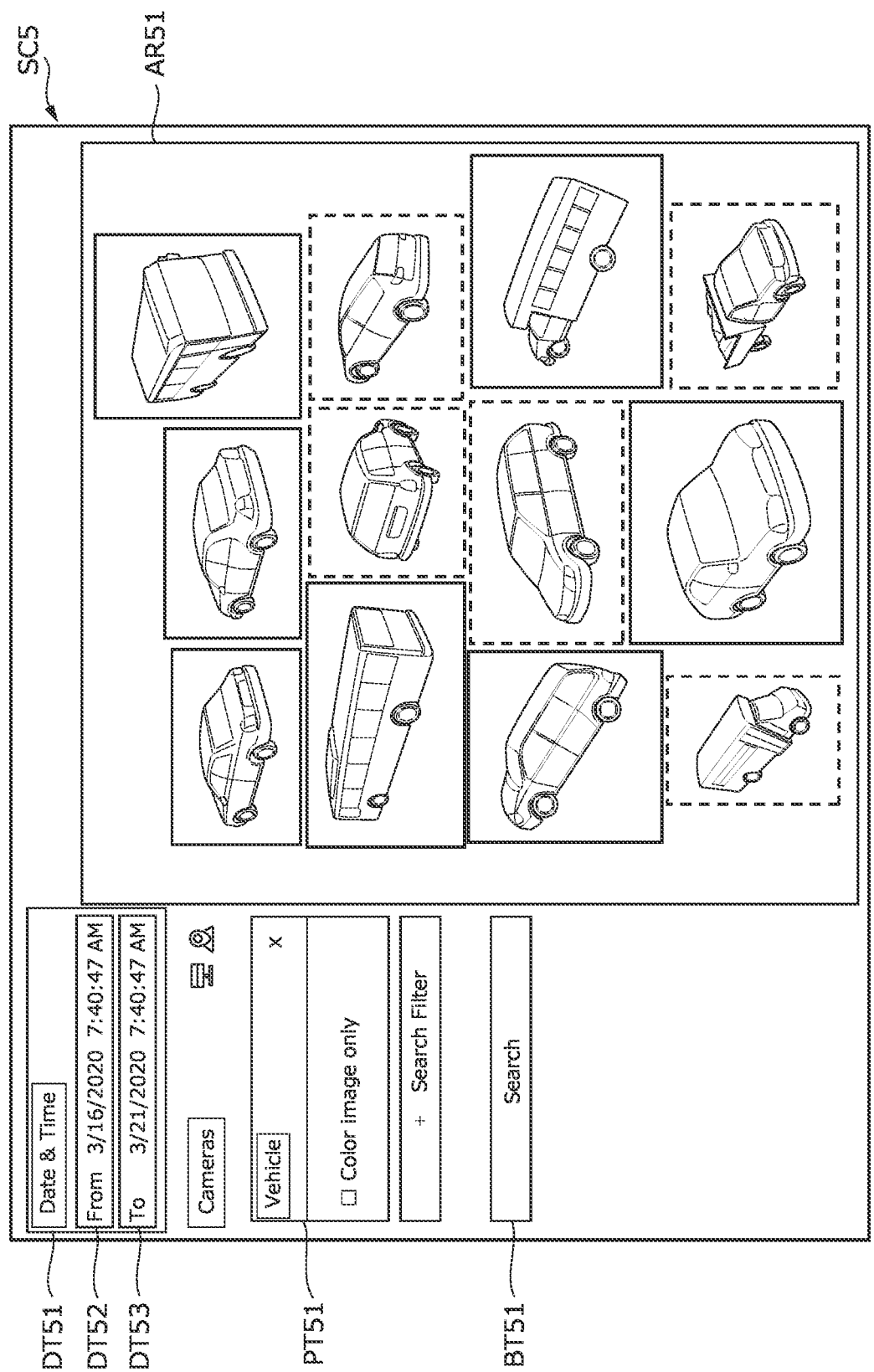
FIG. 8 is a diagram showing an example of a vehicle search result screen including a black-and-white image.
Figure 9:
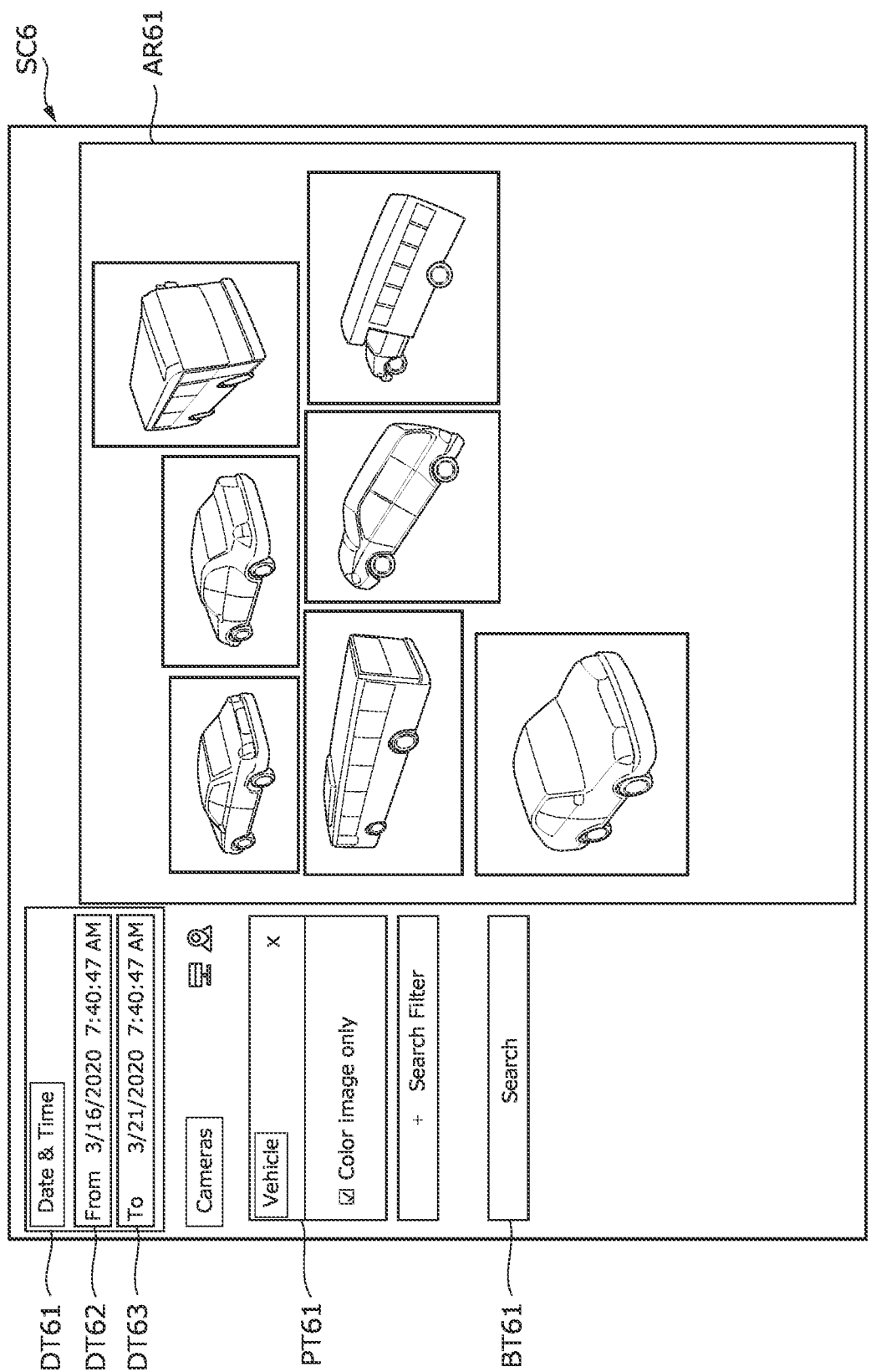
FIG. 9 is a diagram showing an example of a vehicle search result screen excluding a black-and-white image.

Next, search result screens SC5 and SC6 displayed on the terminal device P1 will be described with reference to FIGS. 8 and 9. FIG. 8 is a diagram showing an example of the vehicle search result screen SC5 including a black-and-white image. FIG. 9 is a diagram showing an example of the vehicle search result screen SC6 excluding a black-and-white image. The search result screens SC5 and SC6 shown in FIGS. 8 and 9 are merely examples, and it is needless to say that the present invention is not limited thereto.

Although the search result screens SC5 and SC6 shown in FIGS. 8 and 9 include input fields of search conditions related to imaging date and time, and vehicle detection information and image color information, these search conditions may be set on the search condition setting screen SC2 (see FIG. 3). Further, on the search result screens SC5 and SC6 shown in FIGS. 8 and 9, search conditions corresponding to various setting items shown on the search condition setting screen SC2 (see FIG. 3) may be set by "Search Filter". Specifically, when "Search Filter" is selected (pressed) by a user operation on the search result screens SC5 and SC6, the terminal device P1 may display a setting field (not shown) capable of setting search conditions corresponding to various setting items shown on the search condition setting screen SC2 (see FIG. 3) and receive an input of a search condition based on a user operation, or the terminal device P1 may shift to the search condition setting screen SC2 (see FIG. 3) and receive an input of a search condition based on a user operation.

The search result screen SC5 shown in FIG. 8 is generated based on the search result data transmitted from the server S1 by the terminal device P1, and is displayed on the monitor 23. Specifically, the search result screen SC5 includes an imaging date and time setting field DT51, a vehicle search condition field PT51, a search button BT51, and a search result display region AR51.

The imaging date and time setting field DT51 receives an input operation of a user for a search condition related to imaging date and time when a best shot image is captured or a period of imaging date and time. The terminal device P1 sets a search condition based on the information of the imaging date and time input to imaging start date and time DT52 and imaging end date and time DT53. In the example shown in FIG. 8, the terminal device P1 sets a search condition for searching for best shot images from "Mar. 16, 2020 7:40:47 AM" input to the imaging start date and time DT52 to "Mar. 21, 2020 7:40:47 AM" input to the imaging end date and time DT53.

The vehicle search condition field PT51 receives an input operation of a user for setting a search condition "Color image only" related to a vehicle serving as an object. The terminal device P1 sets search conditions selected (pressed) by a user operation. In the example shown in FIG. 8, the terminal device P1 sets a search condition of invalidating the search condition "Color image only".

The search button BT51 is a button for requesting the server S1 to execute a search processing based on the search conditions set in the imaging date and time setting field DT51 and the vehicle search condition field PT51. When the search button BT51 is pressed (selected) by a user, the terminal device P1 generates search conditions set in the imaging date and time setting field DT51 and the vehicle search condition field PT51, and a control command for requesting a search based on the search conditions, and transmits the generated search conditions and control command to the server S1.

The search result display region AR51 displays a list of best shot images included in search result data searched and transmitted by the server S1, based on the search conditions set in the imaging date and time setting field DT51 and the vehicle search condition field PT51.

The search result display region AR51 shown in FIG. 8 displays 12 best shot images as a search result based on the search conditions set in the imaging date and time setting field DT51 and the vehicle search condition field PT51. In the search result display region AR51 shown in FIG. 8, seven best shot images surrounded by solid line frames are color images. Similarly, five best shot images surrounded by broken line frames are black-and-white images.

The search result screen SC6 shown in FIG. 9 is generated based on the search result data transmitted from the server S1 by the terminal device P1, and is displayed on the monitor 23. Specifically, the search result screen SC6 includes an imaging date and time setting field DT61, a vehicle search condition field PT61, a search button BT61, and a search result display region AR61.

The imaging date and time setting field DT61 receives an input operation of a user for a search condition related to imaging date and time when a best shot image is captured or a period of imaging date and time. The terminal device P1 sets a search condition based on the information of the imaging date and time input to imaging start date and time DT62 and imaging end date and time DT63. In the example shown in FIG. 9, the terminal device P1 sets a search condition for searching for best shot images from "Mar. 16, 2020 7:40:47 AM" input to the imaging start date and time DT62 to "Mar. 21, 2020 7:40:47 AM" input to the imaging end date and time DT63.

The vehicle search condition field PT61 receives an input operation of a user for setting a search condition "Color image only" related to the vehicle serving as an object. The terminal device P1 sets search conditions selected (pressed) by a user operation. In the example shown in FIG. 9, the terminal device P1 sets a search condition of validating the search condition "Color image only".

The search button BT61 is a button for requesting the server S1 to execute a search processing based on the search conditions set in the imaging date and time setting field DT61 and the vehicle search condition field PT61. When the search button BT61 is pressed (selected) by a user, the terminal device P1 generates search conditions set in the imaging date and time setting field DT61 and the vehicle search condition field PT61, and a control command for requesting a search based on the search conditions, and transmits the generated search conditions and control command to the server S1.

The search result display region AR61 displays a list of best shot images included in search result data that is searched and transmitted by the server S1, based on the search conditions set in the imaging date and time setting field DT61 and the vehicle search condition field PT61.

The search result display region AR61 shown in FIG. 9 displays seven best shot images as a search result based on the search conditions set in the imaging date and time setting field DT61 and the vehicle search condition field PT61. In the search result display region AR61 shown in FIG. 9, seven best shot images surrounded by solid line frames are color images.

Modification of First Embodiment

The search support system 100 according to the first embodiment invalidates or validates the search condition "Color image only", so as to determine whether to exclude a best shot image that is not a color image (that is, a best shot image whose image color information indicates a black-and-white image) from a search target. When the search condition "Color image only" is validated, the search support system 100 outputs a search result excluding a best shot image that is not a color image (that is, a best shot image whose image color information indicates a black-and-white image). When the search condition "Color image only" is constantly validated, the search support system 100 according to the modification of the first embodiment outputs a search result excluding a best shot image that is not a color image (that is, a best shot image whose image color information indicates a black-and-white image).

An internal configuration example of the search support system 100 according to the modification of the first embodiment is substantially the same as the internal configuration example of the search support system 100 according to the first embodiment, and thus description thereof will be omitted.

A search condition setting screen according to the modification of the first embodiment does not include an item of a search condition "Color image only". Similarly, a search result screen according to the modification of the first embodiment does not include an item of a search condition "Color image only" in a person search condition field.

Figure 10:
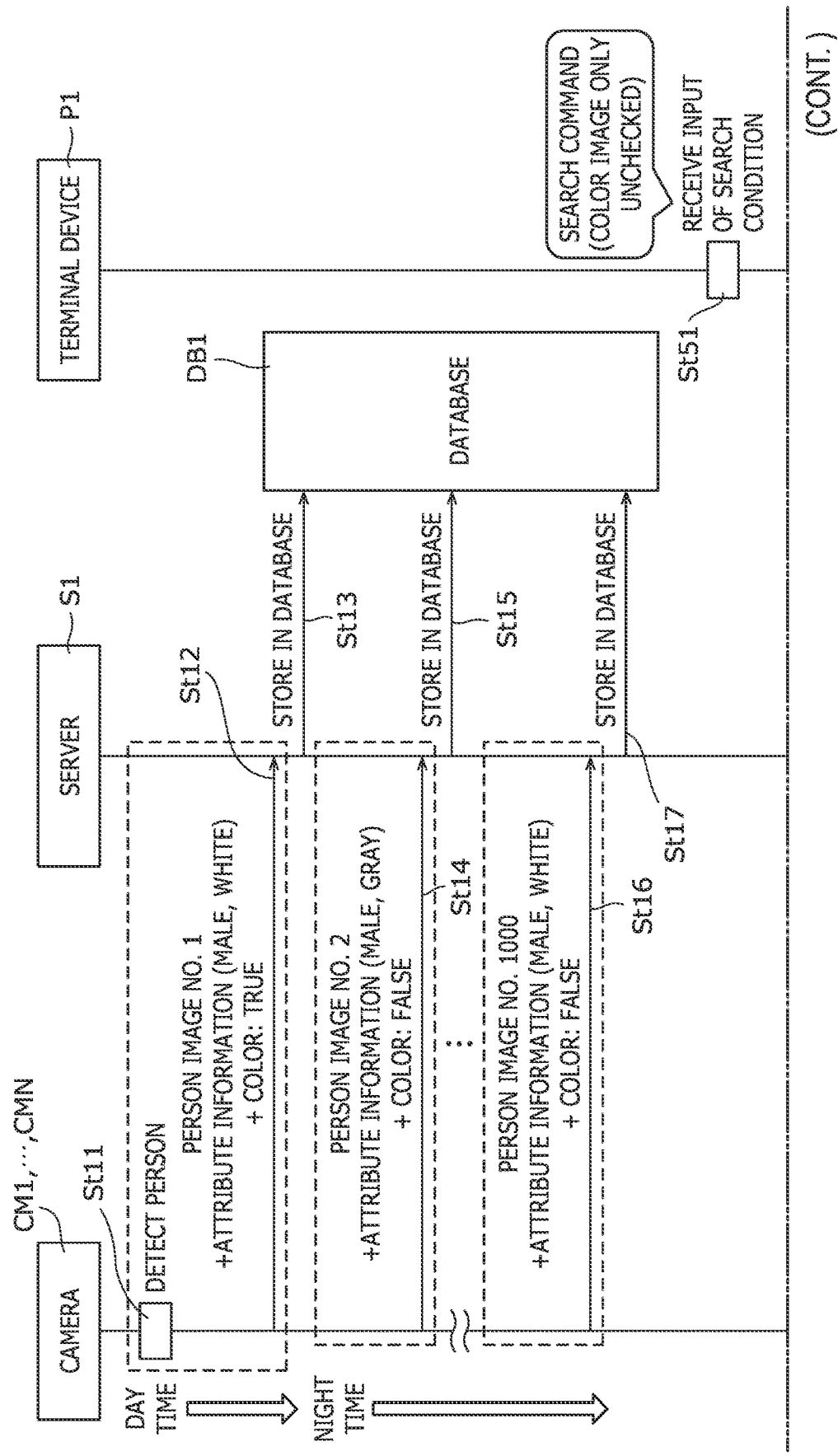
FIG. 10 is a sequence diagram showing an example of a person search procedure of a search support system according to a modification of the first embodiment.

A person search procedure executed by the search support system 100 will be described with reference to FIG. 10. FIG. 10 is a sequence diagram showing an example of a person search procedure of the search support system 100 according to the modification of the first embodiment. The sequence diagram shown in FIG. 10 is a diagram specifically showing a search procedure based on a search condition example input in a processing in step St51 in order to facilitate understanding of the search procedure executed by the server S1 according to the modification of the first embodiment. Processing in steps St11 to St17 in the search procedure example shown in FIG. 10 are the same as the processing in steps St11 to St17 in the search procedure example shown in FIG. 4, and thus description thereof will be omitted. Examples of various kinds of data registered in the database DB1 described with reference to FIG. 10 are the same as those in FIG. 4B, and thus illustration and description thereof will be omitted.

The terminal device P1 receives an input (setting) operation of a search condition from a user using the input unit 24 (St51). Here, an example of the search condition set in step St51 shown in FIG. 10 will be described in which a condition related to an object feature amount is that the gender of the person is "male" and the tops color is "white" or "gray". The terminal device P1 transmits the set search condition (the gender of the person is "male" and the tops color is "white" or "gray") to the server S1 (St52).

The server S1 determines whether the search condition transmitted from the terminal device P1 includes a search condition related to a predetermined color (a color detected from a black-and-white image, for example, white, black, gray, and the like) (St53).

When it is determined that the search condition transmitted from the terminal device P1 includes the search condition related to the predetermined color (in the example shown in FIG. 10, the tops color is "white" or "gray"), among all best shot images (see the database DB1 shown in FIG. 4B) stored (registered) in the database DB1, the server S1 excludes a best shot image whose image color information indicates a black-and-white image (that is, a best shot image associated with information indicating color "FALSE") from a search target, and collates the metadata associated with the 1000 best shot images registered in the database DB1 with the search condition (specifically, the gender of the person is "male" and the tops color is "white" or "gray"). The server S1 searches for a person image (a best shot image) that is determined satisfying the search condition (St54).

On the other hand, when the server S1 determines that the search condition transmitted from the terminal device P1 does not include the search condition related to the predetermined color, the server S1 collates the metadata associated with the 1000 best shot images registered in the database DB1 with the search condition (specifically, the gender of the person is "male" and the tops color is "white" or "gray"). The server S1 searches for a person image (a best shot image) that is determined satisfying the search condition (St54).

The server S1 generates search result data (here, one best shot image associated with the number "No. 1") based on the person image (the best shot image) that is determined satisfying the search condition, and transmits the search result data to the terminal device P1 (St55).

The terminal device P1 displays the search result data transmitted from the server S1 (that is, the one best shot image associated with the number "No. 1") on the monitor 23 (St56).

As described above, when a search condition includes a predetermined color such as white, black, and gray that are colors detectable from a black-and-white image, the search support system 100 according to the modification of the first embodiment can execute a search processing by excluding a best shot image whose image color information indicates a black-and-white image from a search target regardless of whether the search condition "Color image only" is set.

Second Embodiment

An example of a search method is described in the first embodiment in which the search support system 100 according to the first embodiment validates the search condition "Color image only". An example of a search method will be described in the second embodiment in which the search support system 100 according to the second embodiment validates the search condition "Recognizable face only", so that the search support system 100 can search for a best shot image in which a face that can be used in a face authentication (face collation) processing is detected among black-and-white images captured in the nighttime.

An internal configuration example of the search support system 100 according to the second embodiment is substantially the same as the internal configuration example of the search support system 100 according to the first embodiment, and thus description thereof will be omitted.

Figure 11A:
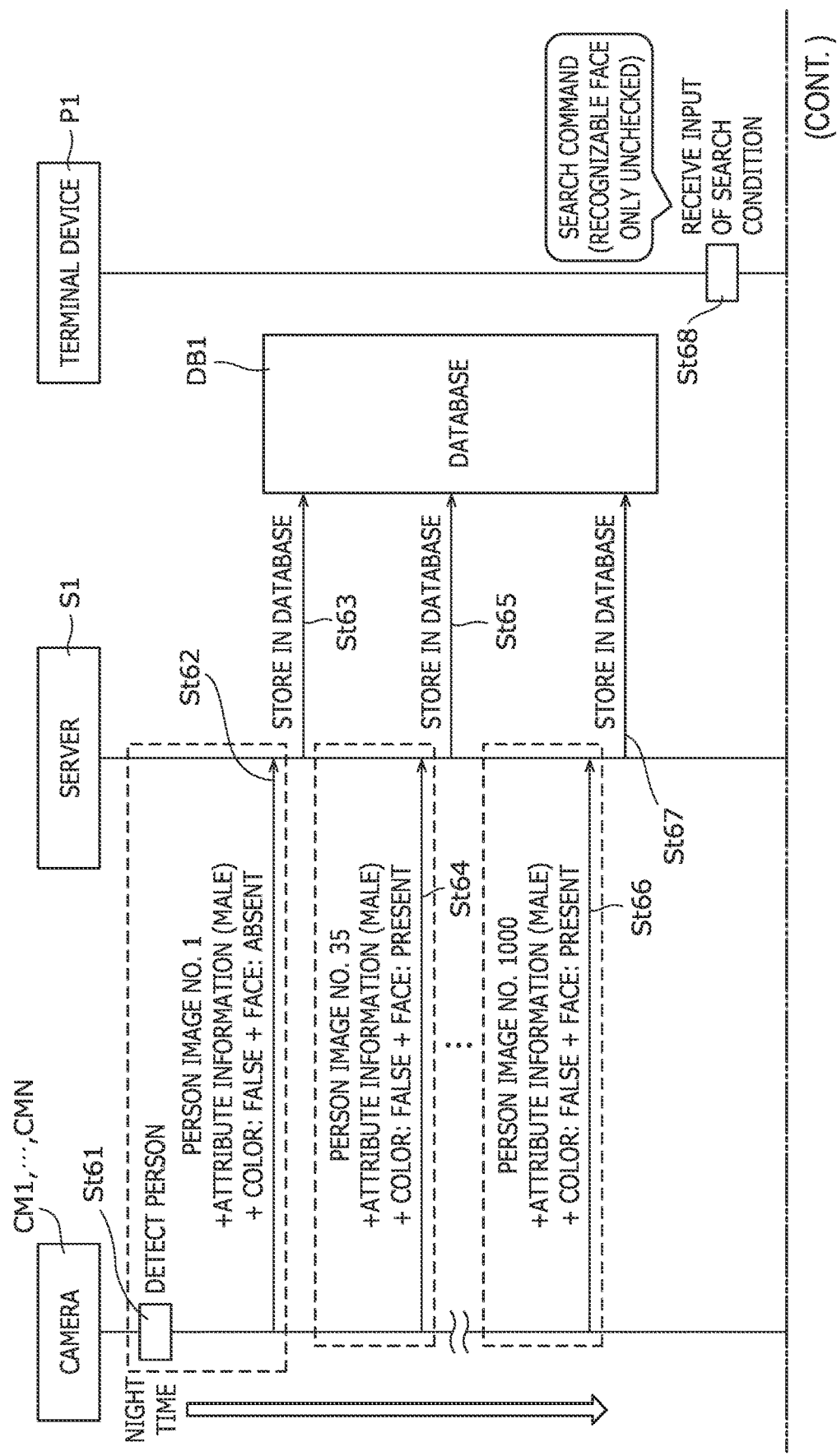
FIG. 11A is a sequence diagram showing an example of a person search procedure of a search support system according to a second embodiment.
Figure 11B:
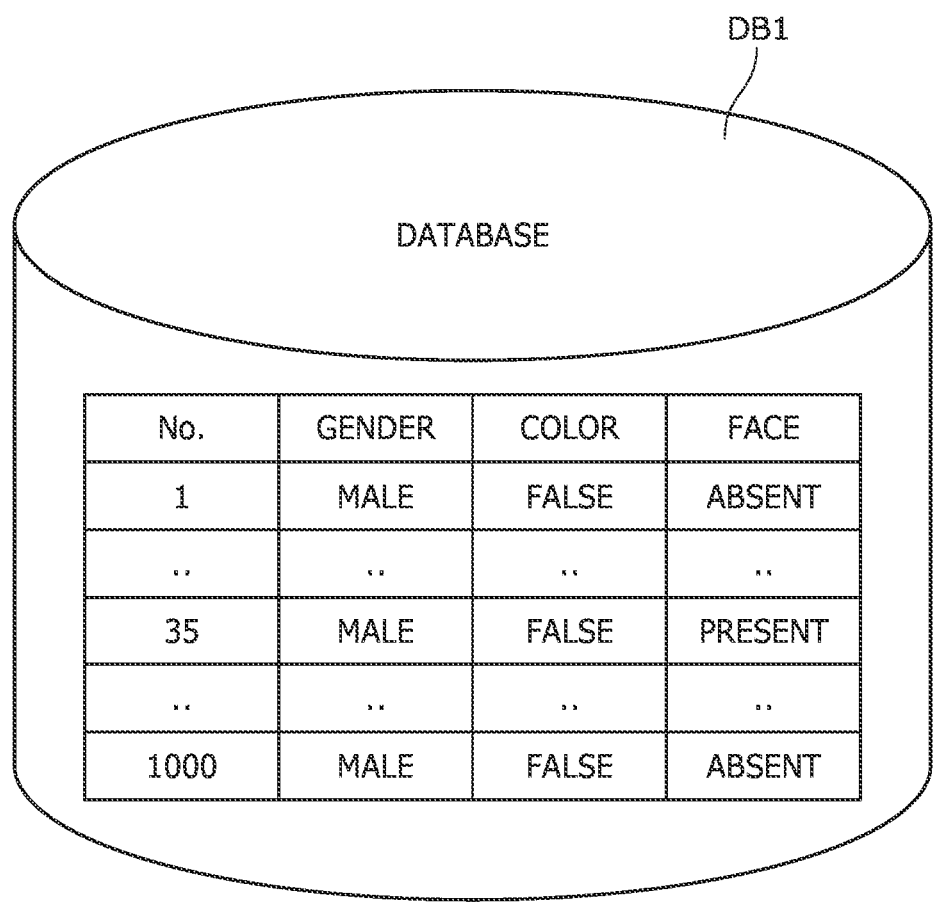
FIG. 11B is a diagram showing an example of various kinds of data registered in a database in the example of the person search procedure of the search support system according to the second embodiment.

Next, a person search procedure executed by the search support system 100 will be described with reference to FIGS. 11A and 11B. FIG. 11A is a sequence diagram showing an example of a person search procedure of the search support system 100 according to the second embodiment. FIG. 11B is a diagram showing an example of various kinds of data registered in the database DB1 in the example of the person search procedure of the search support system 100 according to the second embodiment. The sequence diagram shown in FIG. 11A is a diagram specifically showing a search procedure based on two search condition examples input in processing in step St68 and step St73 in order to facilitate understanding of the search procedure executed by the server S1 according to the second embodiment. The two search condition examples are merely examples, and it is needless to say that the present disclosure is not limited thereto.

Although the sequence diagram shown in FIG. 11A shows an example in which all best shot images are black-and-white images captured in a time range of nighttime in order to facilitate understanding of the search procedure executed by the server S1 according to the second embodiment, the best shot images may be color images captured in a time range of daytime.

Each of the plurality of cameras CM1 to CMN detects a person serving as an object based on a captured image of a monitoring area (St61). Each of the plurality of cameras CM1 to CMN selects a best shot image for each detected person serving as an object, and executes a face detection information generation determination processing (that is, a face detection information generation determination based on a determination as to whether the face of the person serving as an object is reflected in a best shot image), an object (person) feature amount extraction processing, an image color information generation processing of a best shot image, and the like based on the selected best shot image. Each of the plurality of cameras CM1 to CMN generates metadata in which the face detection information, the object feature amount information, the face detection information, and the image color information are associated with one another.

Each of the plurality of cameras CM1 to CMN generates detection data in which the generated metadata, a best shot image of the person, and camera information capable of identifying a camera are associated with one another, and transmits the detection data to the server S1 (St62). A best shot image "person image No. 1" of the person transmitted to the server S1 in step St62 is a black-and-white image captured in a time range of nighttime, and indicates an example in which the gender "male" that is attribute information of the person serving as object feature amount information is associated with the image color information "FALSE". The image color information "FALSE" referred to here indicates that the best shot image "person image No. 1" is a black-and-white image. Similarly, face "absent" indicates that the face of the person is not detected in the best shot image. The face "absent" may indicate that face detection information that is information indicating that the face of the person is detected in the best shot image is not included.

The server S1 stores (registers) the best shot image "person image No. 1" transmitted from each of the plurality of cameras CM1 to CMN in the database DB1 (St63).

Each of the plurality of cameras CM1 to CMN detects a person serving as an object based on a captured image of a monitoring area (see the processing in step St61 in a broken line portion shown in FIG. 11A). Each of the plurality of cameras CM1 to CMN generates detection data in which the generated metadata, a best shot image of the person, and camera information capable of identifying a camera are associated with one another, and transmits the detection data to the server S1 (St64). A best shot image "person image No. 35" of the person transmitted to the server S1 in step St64 is a black-and-white image captured in a time range of nighttime, and indicates an example in which the gender "male" that is attribute information of the person serving as object feature amount information, the image color information "FALSE", and the face detection information are associated with one another. The image color information "FALSE" here indicates that the best shot image "person image No. 35" is a black-and-white image. Similarly, the face "present" indicates that the face detection information that is information indicating that the face of the person is detected in the best shot image is included.

The server S1 stores (registers) the best shot image "person image No. 35" transmitted from each of the plurality of cameras CM1 to CMN in the database DB1 (St65).

Similarly, each of the plurality of cameras CM1 to CMN detects a person serving as an object based on a captured image of a monitoring area (see the processing in step St61 in a broken line portion shown in FIG. 11A). Each of the plurality of cameras CM1 to CMN generates detection data in which the generated metadata, a best shot image of the person, and camera information capable of identifying a camera are associated with one another, and transmits the detection data to the server S1 (St66). A best shot image "person image No. 1000" of a person transmitted to the server S1 in step St66 is a black-and-white image captured in a time range of nighttime, and indicates an example in which the gender "male" that is attribute information of the person serving as object feature amount information, the image color information "FALSE", and the face detection information are associated with one another. The image color information "FALSE" referred to here indicates that the best shot image "person image No. 1000" is a black-and-white image. Similarly, the face "present" indicates that the face detection information that is information indicating that the face of the person is detected in the best shot image is included.

The server S1 stores (registers) the best shot image "person image No. 1000" transmitted from each of the plurality of cameras CM1 to CMN in the database DB1 (St67).

Through the processing in steps St61 to St67 described above, the database DB1 shown stores (registers) the number of a best shot image ("No." shown in FIG. 11B), the gender information "male" of a person, the image color information "TRUE" or "FALSE" of a best shot image, the face detection information "present" or "absent", and 1000 best shot images in association with one another. The best shot images shown in FIGS. 11A and 11B and metadata (for example, face detection information, a feature amount of a person, image color information, and the like) associated with each of the best shot images are merely examples, and it is needless to say that the present invention is not limited thereto. In order to make the description easy to understand, a search procedure of a best shot image that satisfies a search condition using each of the 1000 best shot images registered in the database DB1 shown in FIG. 11B will be specifically described in the following description of processing in steps St68 to St77. In FIGS. 11A and 11B, in best shot images associated with the numbers "No. 3" to "No. 34" and "No. 36" to "No. 999", the attribute information of a person is gender "male", the image color information is "FALSE", and the face detection information is "absent", and description and illustration thereof are omitted.

The terminal device P1 receives an input (setting) operation of a search condition from a user using the input unit 24 (St68). Here, an example of the search condition set in step St68 shown in FIG. 11A will be described in which the search condition "Recognizable face only" is not set (invalidated) and a condition related to an object feature amount is that the gender of the person is "male". The terminal device P1 transmits the set search condition (the gender of the person is "male") to the server S1 (St69).

Based on the search condition transmitted from the terminal device P1, the server S1 refers to the object feature amount (here, the attribute information of the person) associated with each of the plurality of best shot images stored (registered) in the database DB1, and searches for a person image (that is, a best shot image) that satisfies the search condition (St70). Here, the server S1 in the example shown in FIG. 11A collates the metadata associated with each of the 1000 best shot images registered in the database DB1 with the search condition (specifically, the gender of the person is "male"), and searches for a person image (a best shot image) that is determined satisfying the search condition. The server S1 generates search result data based on the person image (the best shot image) that is determined satisfying the search condition, and transmits the generated search result data (here, each of the 1000 best shot images associated with the numbers "No. 1" to "No. 1000") to the terminal device P1 (St71).

The terminal device P1 displays the search result data transmitted from the server S1 (that is, the 1000 best shot images associated with the numbers "No. 1" to "No. 1000") on the monitor 23 (St72).

The terminal device P1 receives an input (setting) operation of a search condition from a user using the input unit 24 (St73). Here, an example of the search condition set in step St73 shown in FIG. 11A will be described in which the search condition "Recognizable face only" is set (validated) and a condition related to an object feature amount is that the gender of the person is "male". The terminal device P1 transmits the set search condition (the face detection information of the person is present and the gender of the person is "male") to the server S1 (St74).

Based on the search condition transmitted from the terminal device P1, the server S1 refers to the object feature amount (here, the attribute information of the person) associated with each of the plurality of best shot images stored (registered) in the database DB1, and searches for a person image (that is, a best shot image) that satisfies the search condition (St75). Here, the server S1 in the example shown in FIG. 11A collates the metadata associated with each of the 1000 best shot images registered in the database DB1 with the search condition (specifically, the face detection information of the person is present and the gender of the person is "male"), and searches for a person image (a best shot image) that is determined satisfying the search condition. The server S1 generates search result data based on the person image (the best shot image) that is determined satisfying the search condition, and transmits the generated search result data (here, one best shot image associated with the number "No. 35") to the terminal device P1 (St76).

The terminal device P1 displays the search result data transmitted from the server S1 (that is, one best shot image associated with the number "No. 35") on the monitor 23 (St77).

As described above, the search support system 100 according to the second embodiment invalidates or validates the search condition "Recognizable face only" in a search for a best shot image of a person using a black-and-white image captured in the nighttime only, so as to determine whether to exclude a best shot image in which the face of the person is not reflected or cannot be used in the face authentication (that is, a best shot image not associated with the face detection information) from a search target. Accordingly, when the search condition "Recognizable face only" is validated, the search support system 100 can output a search result excluding a best shot image in which the face of the person is not reflected or cannot be used in the face authentication (that is, a best shot image not associated with the face detection information). Accordingly, the search support system 100 can search for and output a best shot image in which a person satisfying a search condition set by a user is captured among best shot images in which it is determined that the face of the person is recognizable.

Figure 12:
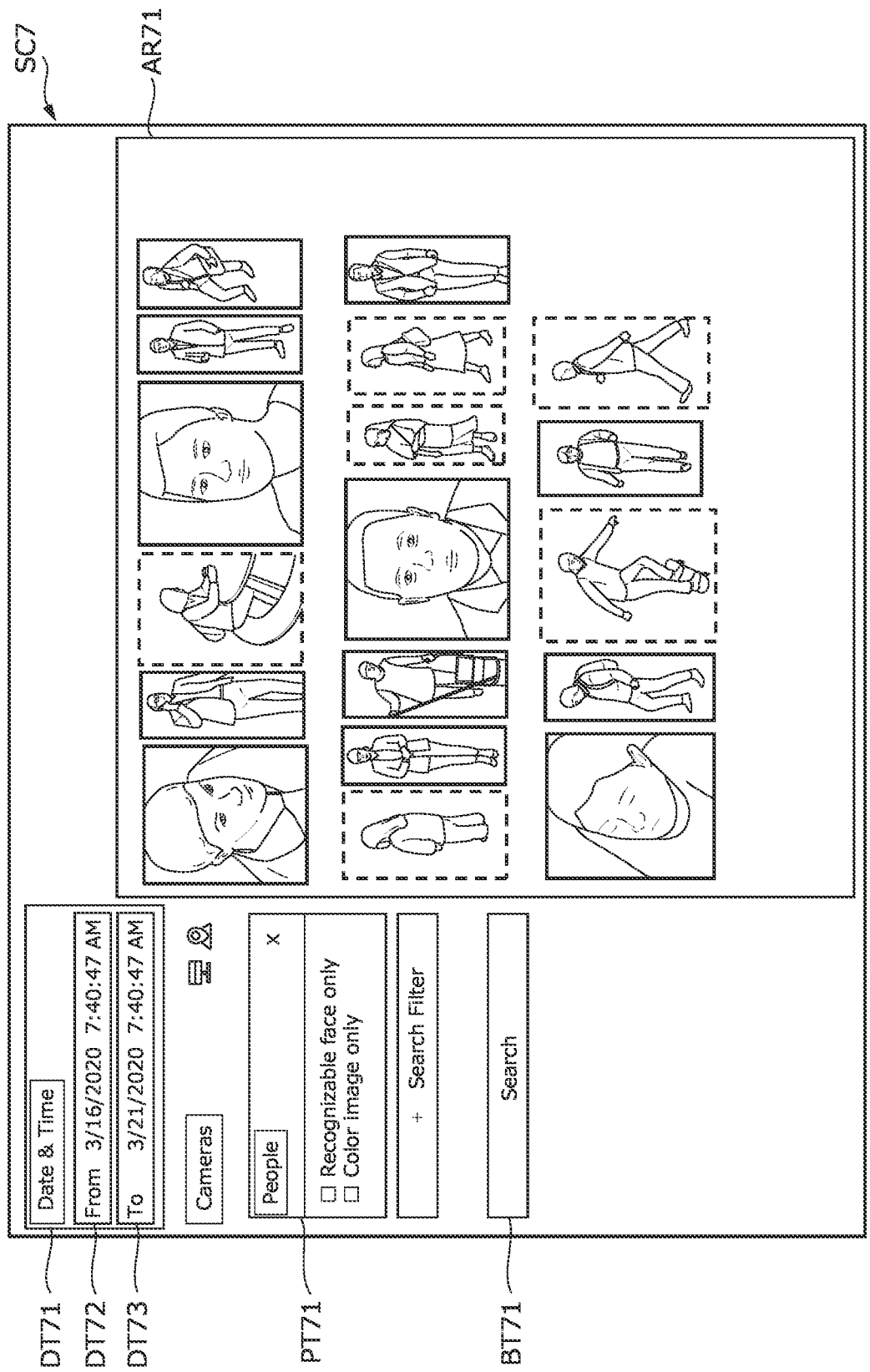
FIG. 12 is a diagram showing an example of a person search result screen including a black-and-white image.
Figure 13:
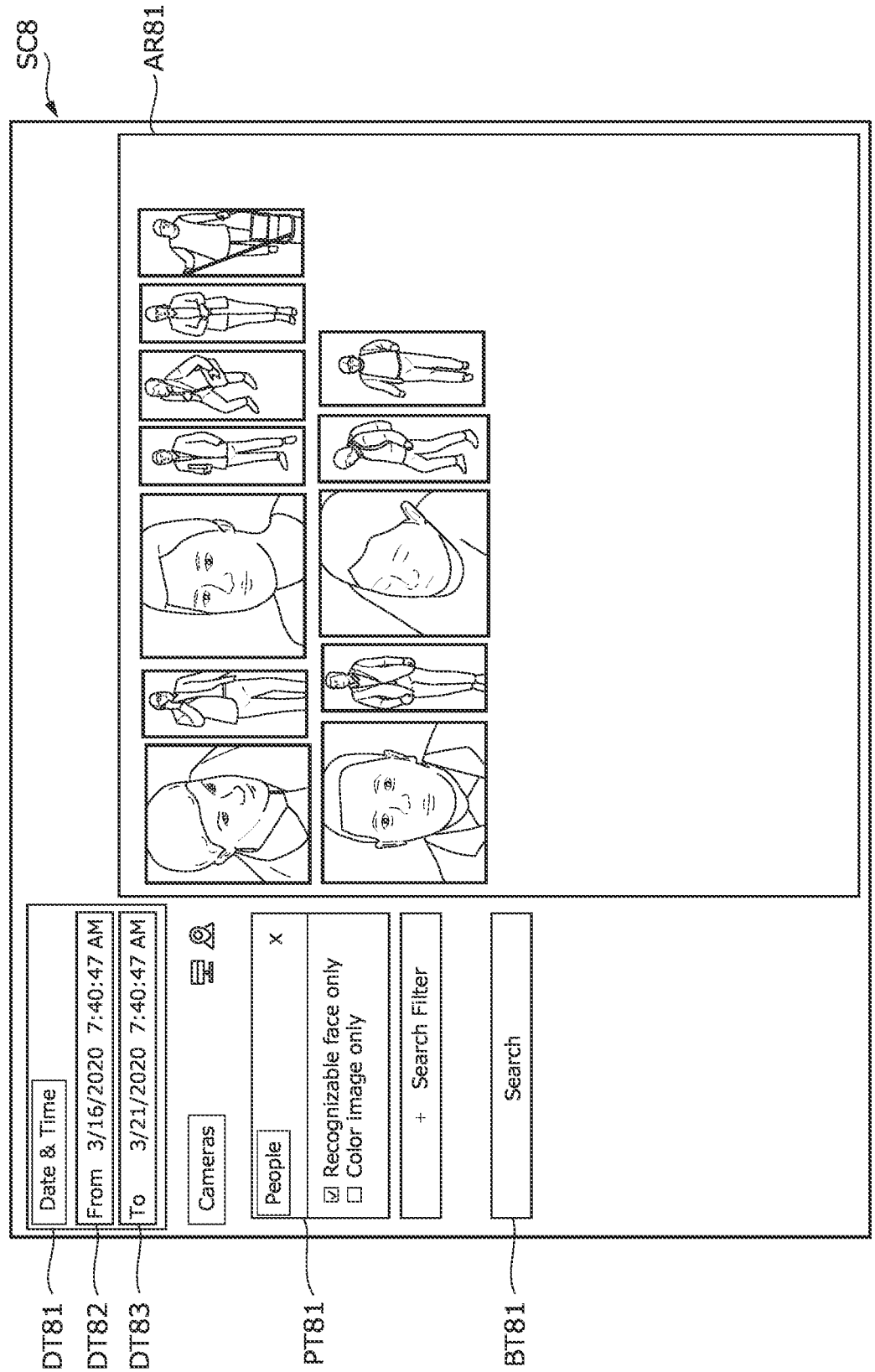
FIG. 13 is a diagram showing an example of a person search result screen excluding a black-and-white image.

Next, search result screens SC7 and SC8 displayed on the terminal device P1 will be described with reference to FIGS. 12 and 13. FIG. 12 is a diagram showing an example of the person search result screen SC7 including a black-and-white image. FIG. 13 is a diagram showing an example of the person search result screen SC8 excluding a black-and-white image. The search result screens SC7 and SC8 shown in FIGS. 12 and 13 are merely examples, and it is needless to say that the present invention is not limited to thereto.

Although the search result screens SC7 and SC8 shown in FIGS. 12 and 13 include input fields of search conditions related to imaging date and time, face detection information, and image color information, these search conditions may be set on the search condition setting screen SC1 (see FIG. 2). Further, on the search result screens SC7 and SC8 shown in FIGS. 12 and 13, search conditions corresponding to various setting items shown on the search condition setting screen SC1 (see FIG. 2) may be set by "Search Filter". Specifically, when "Search Filter" is selected (pressed) by a user operation on the search result screens SC7 and SC8, the terminal device P1 may display a setting field (not shown) capable of setting search conditions corresponding to various setting items shown on the search condition setting screen SC1 (see FIG. 2) and receive an input of a search condition based on a user operation, or the terminal device P1 may shift to the search condition setting screen SC1 (see FIG. 2) and receive an input of a search condition based on a user operation.

The search result screen SC7 shown in FIG. 12 is generated based on the search result data transmitted from the server S1 by the terminal device P1, and is displayed on the monitor 23. Specifically, the search result screen SC7 includes an imaging date and time setting field DT71, a person search condition field PT71, a search button BT71, and a search result display region AR71.

The imaging date and time setting field DT71 receives an input operation of a user for a search condition related to imaging date and time when a best shot image is captured or a period of imaging date and time. The terminal device P1 sets a search condition based on the information of the imaging date and time input to imaging start date and time DT72 and imaging end date and time DT73. In the example shown in FIG. 12, the terminal device P1 sets a search condition for searching for best shot images from "Mar. 16, 2020 7:40:47 AM" input to the imaging start date and time DT72 to "Mar. 21, 2020 7:40:47 AM" input to the imaging end date and time DT73.

The person search condition field PT71 receives an input operation of a user for setting a search condition "Recognizable face only" and a search condition "Color image only" related to a person serving as an object. The terminal device P1 sets search conditions selected (pressed) by a user operation. In the example shown in FIG. 12, the terminal device P1 sets a search condition of invalidating the search condition "Recognizable face only" and the search condition "Color image only".

The search button BT71 is a button for requesting the server S1 to execute a search processing based on the search conditions set in the imaging date and time setting field DT71 and the person search condition field PT71. When the search button BT71 is pressed (selected) by a user, the terminal device P1 generates search conditions set in the imaging date and time setting field DT71 and the person search condition field PT71, and a control command for requesting a search based on the search conditions, and transmits the generated search conditions and control command to the server S1.

The search result display region AR71 displays a list of best shot images included in search result data searched and transmitted by the server S1, based on the search conditions set in the imaging date and time setting field DT71 and the person search condition field PT71.

The search result display region AR71 shown in FIG. 12 displays 18 best shot images as a search result based on the search conditions set in the imaging date and time setting field DT71 and the person search condition field PT71. In the search result display region AR71 shown in FIG. 12, 12 best shot images surrounded by solid line frames are best shot images associated with the face detection information (that is, best shot images in which the face of the person is captured and can be used in the face authentication). Similarly, six best shot images surrounded by broken line frames are best shot images that are not associated with the face detection information (that is, best shot images in which the face of a person is not reflected or cannot be used in the face authentication).

The search result screen SC8 shown in FIG. 13 is generated based on the search result data transmitted from the server S1 by the terminal device P1, and is displayed on the monitor 23. Specifically, the search result screen SC8 includes an imaging date and time setting field DT81, a person search condition field PT81, a search button BT81, and a search result display region AR81.

The imaging date and time setting field DT81 receives an input operation of a user for a search condition related to imaging date and time when a best shot image is captured or a period of imaging date and time. The terminal device P1 sets a search condition based on the information of the imaging date and time input to imaging start date and time DT82 and imaging end date and time DT83. In the example shown in FIG. 13, the terminal device P1 sets a search condition for searching for best shot images from "Mar. 16, 2020 7:40:47 AM" input to the imaging start date and time DT82 to "Mar. 21, 2020 7:40:47 AM" input to the imaging end date and time DT83.

The person search condition field PT81 receives an input operation of a user for setting a search condition "Recognizable face only" and a search condition "Color image only" related to a person serving as an object. The terminal device P1 sets search conditions selected (pressed) by a user operation. In the example shown in FIG. 13, the terminal device P1 sets a search condition of validating the search condition "Recognizable face only" and invalidating the search condition "Color image only".

The search button BT81 is a button for requesting the server S1 to execute a search processing based on the search conditions set in the imaging date and time setting field DT81 and the person search condition field PT81. When the search button BT81 is pressed (selected) by a user, the terminal device P1 generates search conditions set in the imaging date and time setting field DT81 and the person search condition field PT81, and a control command for requesting a search based on the search conditions, and transmits the generated search conditions and control command to the server S1.

The search result display region AR81 displays a list of best shot images included in search result data searched and transmitted by the server S1, based on the search conditions set in the imaging date and time setting field DT81 and the person search condition field PT81.

The search result display region AR81 shown in FIG. 13 displays 12 best shot images as a search result based on the search conditions set in the imaging date and time setting field DT81 and the person search condition field PT81. In the search result display region AR81 shown in FIG. 13, 12 best shot images surrounded by solid line frames are best shot images associated with the face detection information (that is, best shot images in which the face of the person is captured and can be used in the face authentication).

As described above, the search support system 100 according to the second embodiment invalidates or validates the search condition "Recognizable face only", so as to determine whether to exclude a best shot image in which the face of the person is not reflected or cannot be used in the face authentication (that is, a best shot image not associated with the face detection information) from a search target. Accordingly, when the search condition "Recognizable face only" is validated, the search support system 100 can output a search result excluding a best shot image in which the face of the person is not reflected or cannot be used in the face authentication (that is, a best shot image is associated with the face detection information). Accordingly, the search support system 100 can search for and output a best shot image in which a person satisfying the search condition set by a user is captured among best shot images in which it is determined that the face of the person can be identified.

As described above, the search support system 100 according to the modification of the first embodiment includes at least one of the camera CM1 to CMN that images an object, and the server S1 that can communicate with the cameras CM1 to CMN. The cameras CM1 to CMN transmit, to the server S1, a captured image (that is, a best shot image) of an object and image color information indicating whether the captured image is a black-and-white image or a color image. The server S1 stores the captured image and the image color information in association with each other in a database, and determines whether a color condition of at least one of white, black, and gray is included in a search condition of the captured image set based on a user operation. When it is determined that the color condition is included in the search condition, the server S1 excludes the captured image associated with the image color information indicating a black-and-white image among all captured images stored in the database DB1 from a search target, and generates and outputs a search result including a captured image that satisfies the search condition. When it is determined that the color condition is not included in the search condition, the server S1 generates and outputs a search result including a captured image that satisfies the search condition among all captured images stored in the database DB1.

Accordingly, when the search condition includes a predetermined color such as white, black, and gray that are colors detectable from a black-and-white image, the search support system 100 according to the modification of the first embodiment can execute a search processing of excluding a best shot image whose image color information indicates a black-and-white image from a search target regardless of whether the search condition "Color image only" is set.

As described above, in the search support system 100 according to the first and second embodiments, the server S1 further determines whether the search condition includes the color condition and the search condition "Color image only" (an example of a first search condition) for searching for a captured image of a color image among all captured images stored in the database DB1 (that is, whether the search condition "Color image only" is validated). When it is determined that the search condition includes the color condition and the search condition "Color image only", the server S1 excludes a captured image associated with the image color information indicating a black-and-white image among all captured images stored in the database from a search target and executes a search for a captured image that satisfies the search condition. Accordingly, when the search condition "Color image only" is validated, the search support system 100 according to the first and second embodiments can output a search result excluding a best shot image that is not a color image (that is, a best shot image whose image color information indicates a black-and-white image). Therefore, the search support system 100 can identify feature amount information related to a color extracted from a color image (for example, white, black, gray, and the like) and feature amount information related to a color extracted from a black-and-white image (for example, white, black, gray, and the like), and can output a search result more suitable for a search condition.

As described above, in the search support system 100 according to the first and second embodiments, the server S1 further determines whether the search condition includes the color condition and the search condition "Recognizable face only" (an example of a second search condition) for searching for a captured image in which a face of a person serving as an object is captured to an extent suitable for a face authentication among captured images that are stored in the database and are associated with image color information indicating a black-and-white image. When it is determined that the search condition includes the color condition and the search condition "Recognizable face only" (that is, the search condition "Recognizable face only" is validated), the server S1 executes a search for a captured image that satisfies the search condition among the captured images that are stored in the database and are associated with the image color information indicating a black-and-white image. Accordingly, when the search condition "Recognizable face only" is validated, the search support system 100 according to the second embodiment can output a search result excluding a best shot image in which the face of the person is not reflected or cannot be used in the face authentication (that is, a best shot image not associated with the face detection information).

As described above, in the search support system 100 according to the first embodiment, the modification of the first embodiment, and the second embodiment, the black-and-white image is an image captured in the nighttime. As a result, when a search condition includes a predetermined color such as white, black, and gray that are colors detectable from a black-and-white image, the search support system 100 according to the first embodiment, the modification of the first embodiment, and the second embodiment can execute a search processing of excluding a best shot image that is captured at nighttime and is a black-and-white image from a search target.

As described above, in the search support system 100 according to the first embodiment, the modification of the first embodiment, and the second embodiment, a color image is an image captured in the daytime. As a result, when a search condition includes a predetermined color such as white, black, and gray that are colors detectable from a black-and-white image, the search support system 100 according to the first embodiment, the modification of the first embodiment, and the second embodiment can execute a search processing so as not to exclude a best shot image that is captured in the daytime and is a color image from a search target.

As described above, the server S1 in the search support system 100 according to the first embodiment, the modification of the first embodiment, and the second embodiment displays a screen for a user to designate the search condition "Color image only" (an example of the first search condition) on a terminal, and receives the search condition "Color image only" based on a user operation on the search condition setting screens SC1 and SC2 (examples of the screen). As a result, the search support system 100 according to the first embodiment, the modification of the first embodiment, and the second embodiment can receive a user operation for validating or invalidating the search condition "Color image only".

As described above, the server S1 in the search support system 100 according to the first embodiment, the modification of the first embodiment, and the second embodiment displays a screen for a user to designate the search condition "Recognizable face only" (an example of the second search condition) on a terminal, and receives the search condition "Recognizable face only" based on a user operation on the search condition setting screen SC1 (an example of the screen). As a result, the search support system 100 according to the first embodiment, the modification of the first embodiment, and the second embodiment can receive a user operation for validating or invalidating the search condition "Recognizable face only".

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in various embodiments described above may be combined freely within a range not deviating from the spirit of the invention.

INDUSTRIAL APPLICABILITY

The present disclosure is useful as a search support system, a search support method, and a search support program that more appropriately search for a search target desired by a user from an image captured by a camera and more efficiently support a monitoring task of a user.

What is claimed is:

1. A search support system comprising:
at least one camera that captures an image of an object; and
a server capable of communicating with the camera,
wherein the camera transmits, to the server, a captured image of the object and image color information indicating that the captured image is either a black-and-white image or a color image,
wherein the server
stores the captured image and the image color information in association with each other in a database, and
determines whether or not a search condition of the captured image set based on a user operation includes a color condition of at least one of white color, black color, and gray color,
wherein when it is determined that the search condition includes the color condition, the server excludes a captured image associated with the image color information indicating the black-and-white image among all captured images stored in the database from a search target, and generates and outputs a search result including a captured image that satisfies the search condition,
wherein when it is determined that the search condition does not include the color condition, the server generates and outputs a search result including a captured image that satisfies the search condition among all captured images stored in the database,
wherein the server further determines whether or not the search condition includes the color condition and a first search condition for searching for a captured image of the color image among all captured images stored in the database, and
wherein when it is determined that the search condition includes the color condition and the first search condition, the server excludes a captured image associated with the image color information indicating the black-and-white image among all captured images stored in the database from a search target, and searches for a captured image that satisfies the search condition.

2. The search support system according to claim 1,
wherein the server further determines whether or not the search condition includes the color condition and a second search condition for searching for a captured image captured to an extent that a face of a person serving as the object is suitable for a face authentication among captured images that are stored in the database and are associated with the image color information indicating the black-and-white image, and
wherein when it is determined that the search condition includes the color condition and the second search condition, the server searches for a captured image that satisfies the search condition from the captured images that are associated with image color information indicating the black-and-white image among all of the captured images that are stored in the database.

3. The search support system according to claim 2,
wherein the server displays a screen for a user to designate the second search condition on a terminal, and receives the second search condition based on a user operation on the screen.

4. The search support system according to claim 1,
wherein the black-and-white image is the captured image captured at night.

5. The search support system according to claim 1,
wherein the color image is the captured image captured in daytime.

6. The search support system according to claim 1,
wherein the server displays a screen for a user to designate the first search condition on a terminal, and receives the first search condition based on a user operation on the screen.

7. A search support method executed by a computer communicably connected to at least one camera that captures an image of an object, the search support method comprising:
storing a captured image of the object and image color information indicating whether the captured image is a black-and-white image or a color image in association with each other in a database;
determining whether or not a search condition of the captured image set based on a user operation includes a color condition of at least one of white color, black color, and gray color;
excluding a captured image associated with the image color information indicating the black-and-white image among all captured images stored in the database from a search target, generating and outputting a search result including a captured image that satisfies the search condition, when it is determined that the search condition includes the color condition; and generating and outputting a search result including a captured image that satisfies the search condition among all captured images stored in the database when it is determined that the search condition does not include the color condition, wherein the determining includes determining whether or not the search condition includes the color condition and a first search condition for searching for a captured image of the color image among all captured images stored in the database, and wherein when it is determined that the search condition includes the color condition and the first search condition, excluding a captured image associated with the image color information indicating the black-and-white image among all captured images stored in the database from a search target, and searches for a captured image that satisfies the search condition.

* * * * *